(12) United States Patent
Sasaki et al.

(10) Patent No.: US 7,978,653 B2
(45) Date of Patent: Jul. 12, 2011

(54) DATA TRANSFER APPARATUS, DATA TRANSFER METHOD, AND RECORDING MEDIUM HAVING DATA TRANSFER PROGRAM RECORDED

(75) Inventors: Kazuo Sasaki, Kawasaki (JP); Tatsuro Matsumoto, Kawasaki (JP); Masayuki Fukui, Kawasaki (JP); Ai Yano, Kawasaki (JP); Eiichi Takahashi, Kawasaki (JP); Masahiro Hara, Kawasaki (JP); Yutaka Iwayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 548 days.

(21) Appl. No.: 12/207,886

(22) Filed: Sep. 10, 2008

(65) Prior Publication Data

US 2009/0082033 A1 Mar. 26, 2009

(30) Foreign Application Priority Data

Sep. 20, 2007 (JP) ................................. 2007-244117

(51) Int. Cl.
*H04W 4/00* (2009.01)
(52) U.S. Cl. ....................................................... 370/329
(58) Field of Classification Search .................. 370/329; 455/455–456.5, 464, 509
See application file for complete search history.

(56) References Cited

U.S. PATENT DOCUMENTS

| 6,073,075 A | 6/2000 | Kondou et al. |
|---|---|---|
| 6,434,479 B1 | 8/2002 | Kondou et al. |
| 6,882,933 B2 | 4/2005 | Kondou et al. |
| 6,983,154 B2 | 1/2006 | Niwa |
| 2002/0039903 A1* | 4/2002 | Niwa .............................. 455/456 |
| 2002/0156578 A1 | 10/2002 | Kondou et al. |

FOREIGN PATENT DOCUMENTS

| JP | 2001-298775 | 10/2001 |
|---|---|---|
| JP | 3387475 | 1/2003 |
| JP | 2003-158777 | 5/2003 |
| JP | 2004-193995 | 7/2004 |
| JP | 2005-275724 | 10/2005 |

* cited by examiner

*Primary Examiner* — Derrick W Ferris
*Assistant Examiner* — Mang Yeung
(74) *Attorney, Agent, or Firm* — Staas & Halsey LLP

(57) ABSTRACT

A data transfer apparatus includes a data transmitting portion, a destination point recording portion, an arrival time calculating portion, a required transfer rate calculating portion, and an occupied transfer rate calculating portion. The data transmitting portion transmits the pieces of untransmitted data to the respective mobile terminals through the communication line in accordance with the respective occupied data transfer rates calculated by the occupied transfer rate calculating portion.

6 Claims, 23 Drawing Sheets

FIG. 2

| TERMINAL ID | MOVEMENT ROUTE | CURRENT POSITION | TIME OF ACQUISITION OF CURRENT POSITION | ESTIMATED TIME OF ARRIVAL |
|---|---|---|---|---|
| Id001 | "idoS, keidoS", "idoC, keidoC", "idoD, keidoD", "idoA, keidoA" | "idoS1, keidoS1" | 9:32 | 10:13 |

FIG. 3

| TERMINAL ID | FILE NAME | SIZE | UNTRANSMITTED SIZE | REQUIRED DATA TRANSFER RATE | OCCUPIED DATA TRANSFER RATE |
|---|---|---|---|---|---|
| Id001 | FileA | 45MB | 40.1MB | 16.3KB/s | 16.3KB/s |

FIG. 7

| TERMINAL ID | MOVEMENT ROUTE | CURRENT POSITION | TIME OF ACQUISITION OF CURRENT POSITION | ESTIMATED TIME OF ARRIVAL |
|---|---|---|---|---|
| Id001 | "idoS, keidoS", "idoC, keidoC", "idoD, keidoD2", "idoA, keidoA" | "idoS1, keidoS1" | 9:32 | 10:13 |
| Id002 | "idoS, keidoS", "idoC, keidoC", "idoE, keidoE2", "idoB, keidoB" | | | |

FIG. 9

| TERMINAL ID | FILE NAME | SIZE | UNTRANSMITTED SIZE | REQUIRED DATA TRANSFER RATE | OCCUPIED DATA TRANSFER RATE |
|---|---|---|---|---|---|
| Id001 | FileA | 45MB | 37.2MB | 16.3KB/s | 16.3KB/s |
| Id002 | FileB | 30MB | 30MB | | |

FIG. 11

| TERMINAL ID | MOVEMENT ROUTE | CURRENT POSITION | TIME OF ACQUISITION OF CURRENT POSITION | ESTIMATED TIME OF ARRIVAL |
|---|---|---|---|---|
| Id001 | "idoS, keidoS", "idoC, keidoC", "idoD, keidoD", "idoA, keidoA" | "idoS1, keidoS1" | 9:32 | 10:13 |
| Id002 | "idoS, keidoS", "idoC, keidoC", "idoE, keidoE", "idoB, keidoB" | "idoS, keidoS" | 9:35 | 10:15 |

FIG. 12

| TERMINAL ID | FILE NAME | SIZE | UNTRANSMITTED SIZE | REQUIRED DATA TRANSFER RATE | OCCUPIED DATA TRANSFER RATE |
|---|---|---|---|---|---|
| Id001 | FileA | 45MB | 37.2MB | 16.3KB/s | 16.3KB/s |
| Id002 | FileB | 30MB | 30MB | 12.5KB/s | |

FIG. 14

| TERMINAL ID | FILE NAME | SIZE | UNTRANSMITTED SIZE | REQUIRED DATA TRANSFER RATE | OCCUPIED DATA TRANSFER RATE |
|---|---|---|---|---|---|
| Id001 | FileA | 45MB | 37.2MB | 16.3KB/s | 16.3KB/s |
| Id002 | FileB | 30MB | 30MB | 12.5KB/s | 12.5KB/s |

FIG. 17

| TERMINAL ID | MOVEMENT ROUTE | CURRENT POSITION | TIME OF ACQUISITION OF CURRENT POSITION | ESTIMATED TIME OF ARRIVAL |
|---|---|---|---|---|
| Id001 | "idoS, keidoS", "idoC, keidoC", "idoD, keidoD", "idoA, keidoA" | "idoC1, keidoC1" | 9:37 | 10:09 |
| Id002 | "idoS, keidoS", "idoC, keidoC", "idoE, keidoE", "idoB, keidoB" | "idoS, keidoS" | 9:35 | 10:15 |

FIG. 18

| TERMINAL ID | FILE NAME | SIZE | UNTRANSMITTED SIZE | REQUIRED DATA TRANSFER RATE | OCCUPIED DATA TRANSFER RATE |
|---|---|---|---|---|---|
| Id001 | FileA | 45MB | 35.2MB | 18.3KB/s | 16.3KB/s |
| Id002 | FileB | 30MB | 28.5MB | 12.5KB/s | 12.5KB/s |

FIG. 19

| TERMINAL ID | FILE NAME | SIZE | UNTRANSMITTED SIZE | REQUIRED DATA TRANSFER RATE | OCCUPIED DATA TRANSFER RATE |
|---|---|---|---|---|---|
| Id001 | FileA | 45MB | 35.2MB | 18.3KB/s | 18.3KB/s |
| Id002 | FileB | 30MB | 28.5MB | 12.5KB/s | 11.7KB/s |

FIG. 21

| TERMINAL ID | FILE NAME | SIZE | UNTRANSMITTED SIZE | REQUIRED DATA TRANSFER RATE | OCCUPIED DATA TRANSFER RATE |
|---|---|---|---|---|---|
| Id002 | FileB | 30MB | 6.56MB | 15.5KB/s | 15.5KB/s |

FIG. 23

| DISTANCE FROM CURRENT POSITION OF MOBILE TERMINAL TO DESTINATION POINT | TIMER VALUE |
|---|---|
| NOT SHORTER THAN 30KM | 10 MIN |
| NOT SHORTER THAN 20KM BUT SHORTER THAN 30KM | 8 MIN |
| NOT SHORTER THAN 10KM BUT SHORTER THAN 20KM | 7 MIN |
| NOT SHORTER THAN 5KM BUT SHORTER THAN 10KM | 6 MIN |
| NOT SHORTER THAN 2KM BUT SHORTER THAN 5KM | 5 MIN |
| NOT SHORTER THAN 1KM BUT SHORTER THAN 2KM | 4 MIN |
| NOT SHORTER THAN 0.5KM BUT SHORTER THAN 1KM | 3 MIN |
| NOT SHORTER THAN 0KM BUT SHORTER THAN 0.5KM | 1 MIN |

DATA TRANSFER APPARATUS, DATA TRANSFER METHOD, AND RECORDING MEDIUM HAVING DATA TRANSFER PROGRAM RECORDED

CROSS-REFERENCE TO RELATED APPLICATIONS

This application is based upon and claims the benefit of priority of the prior Japanese Patent Application No. 2007-244117, filed on Sep. 20, 2007, the entire contents of which are incorporated herein by reference.

BACKGROUND OF THE INVENTION

1. Field of the Invention

An aspect of the invention is related to a data transfer apparatus, a data transfer method and a recording medium having a data transfer program recorded thereon, by which pieces of untransmitted data are extracted from a plurality of contents as transmission targets and transmitted to a plurality of mobile terminals through a transmission line, respectively.

2. Description of the Related Art

With advances such as smaller size and higher function of terminals such as portable phones, personal computers or PDAs in recent years, and the development of wireless network technology, various content which could be used heretofore only in a wired environment have been used easily also in a mobile environment such as the outdoors or travel destination. For example, digitization of paper manuals and storage of these digitized manuals into a server unit have been conducted in a maintenance service of a company. Thus, when a worker uses a mobile terminal to access the server unit to download contents from the server unit to the mobile terminal, the worker can acquire necessary contents easily from travel destination. As a result, it is not necessary for the worker to carry a large amount of paper manuals with him/her anymore.

On the other hand, as the size (data capacity) of contents to be downloaded increases, download time from the start of download to the end of download increases. That is, the worker cannot use the contents unless the download is completed. For example, in a maintenance service of a company, the worker needs to go to a customer's place and repair a product as soon as the worker accepts a customer's request to repair the product. If the worker cannot depart before completion of the download, however, this leads to lowering of quality of the maintenance service. In addition, even if the worker started the download after arrival at the customer's place, the download would take a long time. Consequently, the start of the work repairing the product would be late, causing a lowering of quality of the maintenance service.

Therefore, there has been known a technique in which a worker neither departs after completion of a download nor starts the download after arrival at a destination. The worker, rather, starts the download during the worker's travel, in order to complete the download before arriving at the destination. Specifically, the worker first registers travel schedule information about a departure place, a travel destination, a travel start time, a travel means, etc. into a distribution center in advance. The distribution center calculates an estimated time of arrival based on the registered travel schedule information. The distribution center calculates a distribution time based on the estimated time of arrival and distributes contents to a mobile terminal at the time point when the current time just coincides with the distribution time in accordance with a timer. Thus, the worker can use the contents as soon as the worker arrives at the destination.

Such a technique has been disclosed, for example, in JP-A-2001-298775, JP-A-2003-158777 and JP-A-2004-193995.

In the related-art method, however, only the timing for starting distribution of the contents is controlled. Accordingly, in the case where, for example, the moving velocity of the mobile terminal increased during download, there was a possibility that the download would not be completed when the user of the mobile terminal arrived at the destination. In addition, in the case where, for example, another mobile terminal started downloading during the download, there was a possibility that the download would not be completed when the user of the mobile terminal arrived at the destination, because part of a total bandwidth of a communication line had been already spent by the other mobile terminal's download.

SUMMARY OF THE INVENTION

The invention was accomplished in consideration of the foregoing problems. An object of the invention is to provide a data transfer apparatus, a data transfer method and a recording medium having a data transfer program recorded thereon, by which a mobile terminal can complete download of contents before a user of the mobile terminal arrives at a destination even when the moving velocity of the mobile terminal increases during the download or even when another mobile terminal starts download during the download.

According to an aspect of the invention, a data transfer apparatus includes a data transmitting portion which extracts pieces of untransmitted data from a plurality of contents as transmission targets respectively and transmits the extracted pieces of untransmitted data to a plurality of mobile terminals respectively through a communication line, a destination point recording portion on which destination point information expressing destination points as travel destinations of users of the mobile terminals is recorded, an arrival time calculating portion which acquires current position information expressing current positions of the mobile terminals and current time information expressing a current time at intervals of a predetermined time in order to calculate latest moving velocities of the mobile terminals based on the current position information and the current time information acquired at the previous time and the current position information and the current time information acquired at this time, and then to calculate estimated times of arrival as estimated times that the users of the mobile terminals will arrive at the destination points, based on the calculated moving velocities of the mobile terminals and distances from the current positions of the mobile terminals to the destination points, a required transfer rate calculating portion which calculates required data transfer rates necessary for the mobile terminals to complete download of the pieces of untransmitted data before the users of the mobile terminals arrive at the destination points, based on times obtained by subtracting the current time from the estimated times of arrival calculated by the arrival time calculating portion and data capacities of the pieces of untransmitted data, and an occupied transfer rate calculating portion which assigns required bandwidths for achievement of the required data transfer rates to the respective mobile terminals in order of estimated time of arrival to prevent the sum of the required bandwidths from exceeding a total bandwidth of the communication line to thereby calculate occupied data transfer rates to be really used for the respective mobile terminals based on the assigned required bandwidths, wherein the data transmitting portion transmits the pieces of untransmitted data to the respective mobile terminals through the communication line in accordance with the respective occupied data transfer rates calculated by the occupied transfer rate calculating portion.

According to an aspect of the invention, a data transfer method executed by a computer which includes a destination point recording portion with recorded destination point information expressing destination points as travel destinations of users of mobile terminals and which extracts pieces of untransmitted data respectively from a plurality of contents as transmission targets and transmits the extracted pieces of untransmitted data respectively to the plurality of mobile terminals through a communication line, includes the operations of using an arrival time calculating portion provided in the computer to acquire current position information expressing current positions of the mobile terminals and current time information expressing a current time at intervals of a predetermined time to thereby calculate latest moving velocities of the mobile terminals based on the current position information and the current time information acquired at the previous time and the current position information and the current time information acquired at this time, and then to calculate estimated times of arrival as estimated times that the users of the mobile terminals will arrive at the destination points, based on the calculated moving velocities of the mobile terminals and distances from the current positions of the mobile terminals to the destination points (the arrival time calculating operation), using a required transfer rate calculating portion provided in the computer to calculate required data transfer rates necessary for the mobile terminals to complete download of the pieces of untransmitted data before the users of the mobile terminals arrive at the destination points, based on times obtained by subtracting the current time from the estimated times of arrival calculated in the arrival time calculating operation and data capacities of the pieces of untransmitted data (the required transfer rate calculating operation), using an occupied transfer rate calculating portion provided in the computer to assign required bandwidths for achievement of the required data transfer rates to the respective mobile terminals in order of estimated time of arrival to prevent the sum of the required bandwidths from exceeding a total bandwidth of the communication line to thereby calculate occupied data transfer rates to be really used for the respective mobile terminals, based on the assigned required bandwidths (the occupied transfer rate calculating operation), and using a data transmitting portion provided in the computer to transmit the pieces of untransmitted data to the respective mobile terminals through the communication line in accordance with the respective occupied data transfer rates calculated in the occupied transfer rate calculating operation (the data transmitting operation).

According to an aspect of the invention, a recording medium with a recorded data transfer program in the invention is a recording medium with a data transfer program stored therein and executed by a computer which includes a destination point recording portion with recorded destination point information expressing destination points as travel destinations of users of mobile terminals, includes a data transmitting process of extracting pieces of untransmitted data from a plurality of contents as transmission targets respectively and transmitting the extracted pieces of untransmitted data to the plurality of mobile terminals respectively through a communication line, an arrival time calculating process of acquiring current position information expressing current positions of the mobile terminals and current time information expressing a current time at intervals of a predetermined time to thereby calculate latest moving velocities of the mobile terminals based on the current position information and the current time information acquired at the previous time and the current position information and the current time information acquired at this time, and then to calculate estimated times of arrival as estimated times that the users of the mobile terminals will arrive at the destination points, based on the calculated moving velocities of the mobile terminals and distances from the current positions of the mobile terminals to the destination points, a required transfer rate calculating process of calculating required data transfer rates necessary for the mobile terminals to complete download of the pieces of untransmitted data before the users of the mobile terminals arrive at the destination points, based on times obtained by subtracting the current time from the estimated times of arrival calculated in the arrival time calculating process and data capacities of the pieces of untransmitted data, and an occupied transfer rate calculating process of assigning required bandwidths for achievement of the required data transfer rates to the respective mobile terminals in order of estimated time of arrival to prevent the sum of the required bandwidths from exceeding a total bandwidth of the communication line to thereby calculate occupied data transfer rates to be really used for the respective mobile terminals based on the assigned required bandwidths, wherein the data transmitting process is for transmitting the pieces of untransmitted data to the respective mobile terminals through the communication line in accordance with the respective occupied data transfer rates calculated in the occupied transfer rate calculating process.

The above-described embodiments of the present invention are intended as examples, and all embodiments of the present invention are not limited to including the features described above.

BRIEF DESCRIPTION OF THE DRAWINGS

FIG. 2 is a table showing an example of data recorded on a destination point recording portion at a time point 9:32;

FIG. 3 is a table showing an example of data recorded on a transmission information recording portion at the time point 9:32;

FIG. 7 is a table showing an example of data of the destination point recording portion in which route information has been registered by the registration portion;

FIG. 9 is a table showing an example of data of the transmission information recording portion in which contents request information and contents size information have been registered by the registration portion;

FIG. 11 is a table showing an example of data of the destination point recording portion in which estimated times of arrival, current position information and times of acquisition of current positions have been registered by an arrival time calculating portion;

FIG. 12 is a table showing an example of data of the transmission information recording portion in which required data transfer rates have been registered by a required transfer rate calculating portion;

FIG. 14 is a table showing an example of data of the transmission information recording portion in which occupied data transfer rates have been registered by the occupied transfer rate calculating portion;

FIG. 17 is a table showing an example of data of the destination point recording portion in which estimated times of arrival, current position information and times of acquisition of current positions have been registered by the arrival time calculating portion;

FIG. 18 is a table showing an example of data of the transmission information recording portion in which required data transfer rates have been registered by the required transfer rate calculating portion;

FIG. 19 is a table showing an example of data of the transmission information recording portion in which occupied data transfer rates have been registered by the occupied transfer rate calculating portion;

FIG. 21 is a table showing an example of data of the transmission information recording portion in which an occupied data transfer rate has been registered by the occupied transfer rate calculating portion;

FIG. 23 is a table showing an example of data recorded on a time information recording portion.

DETAILED DESCRIPTION OF THE PREFERRED EMBODIMENTS

Figure 1:
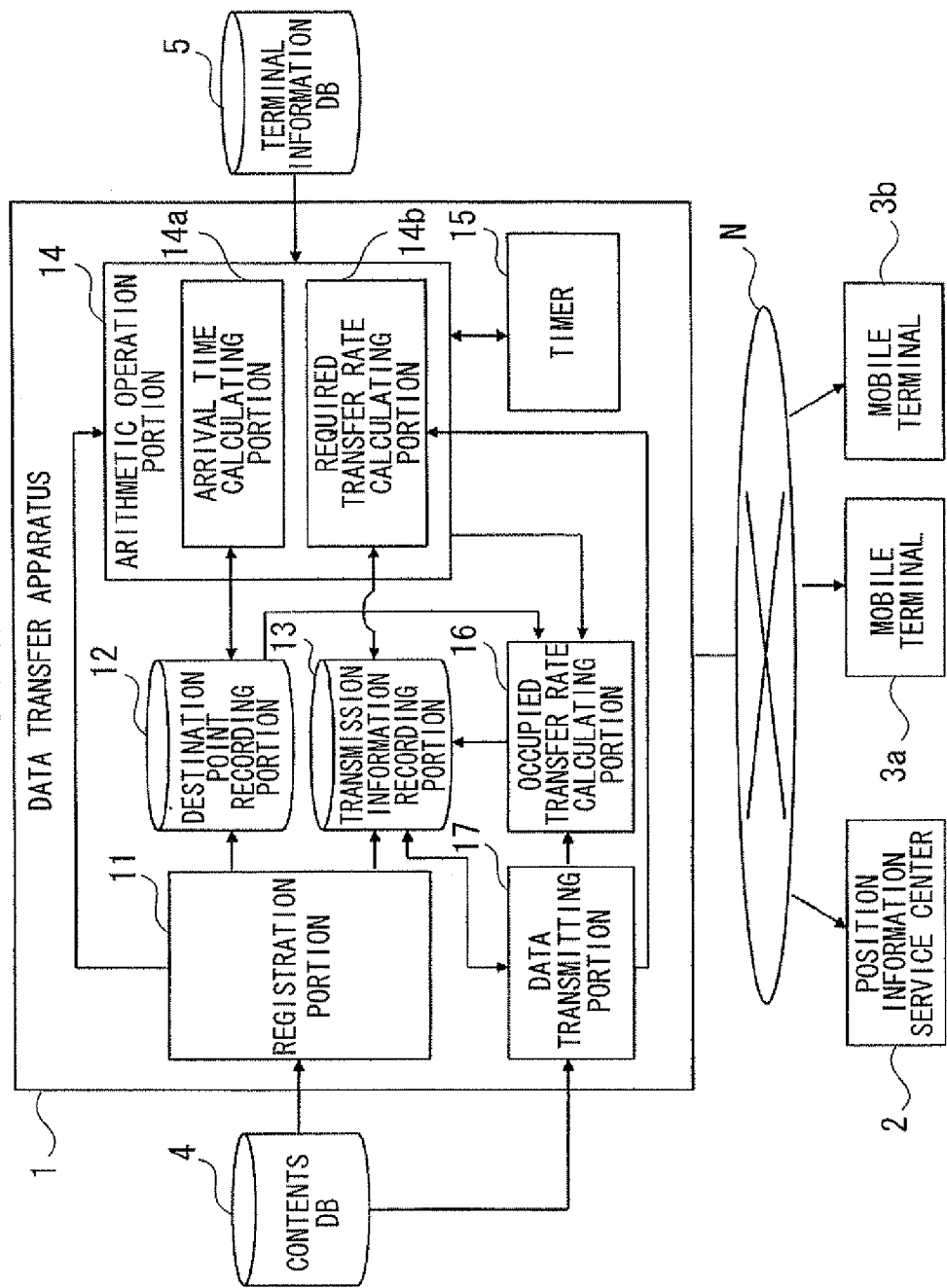
FIG. 1 is a block diagram showing the configuration of a data transfer apparatus according to a first embodiment of the invention together with the configuration of a whole system including the data transfer apparatus.

Reference may now be made in detail to embodiments of the present invention, examples of which are illustrated in the accompanying drawings, wherein like reference numerals refer to like elements throughout.

First Embodiment

FIG. 1 is a block diagram showing the configuration of a data transfer apparatus 1 according to the embodiment and the configuration of a whole system including the data transfer apparatus 1. The data transfer apparatus 1 shown in FIG. 1 is connected to a communication line N. Although the embodiment will be described for the case where the communication line N is the Internet by way of example, the kind of the communication line N is not particularly limited but may be an Ethernet (registered trademark), a wireless LAN, or the like.

A position information service center 2 and mobile terminals 3a and 3b are further connected to the communication line N. The position information service center 2 is a center which provides various position information services to users as long as current position information expressing current positions of the mobile terminals 3a and 3b and phone numbers of the mobile terminals 3a and 3b are stored in the position information service center 2 while the current position information is associated with the phone numbers of the mobile terminals 3a and 3b. Each of the mobile terminals 3a and 3b is a wirelessly communicable terminal such as a portable phone, a PHS (Personal Handyphone System), a PDA (Personal Digital Assistant), an HHT (Hand Held Terminal), a notebook-type personal computer, a tablet-type personal computer or a portable game machine. Each of the mobile terminals 3a and 3b according to the embodiment has a GPS (Global Positioning System) function. With this function, the mobile terminals 3a and 3b transmit the current position information expressing the current positions of the mobile terminals 3a and 3b to the position information service center 2 in real time. Thus, the current position information stored in the position information service center 2 is ceaselessly brought up to date.

Although FIG. 1 shows the case where there is one data transfer apparatus 1, one position information service center 2 and two mobile terminals 3a and 3b for the sake of simplification of description, the respective numbers of data transfer apparatuses, position information service centers and mobile terminals connected to the communication line N are arbitrary. Other devices such as a WWW (World Wide Web) server, a DNS (Domain Name System) server, a DHCP (Dynamic Host Configuration Protocol) server and a user terminal may be connected to the communication line N in addition to the data transfer apparatus 1, the position information service center 2 and the mobile terminals 3a and 3b.

Moreover, a contents database (hereinafter referred to as "contents DB") 4 and a terminal information database (hereinafter referred to as "terminal information DB") 5 are connected to the data transfer apparatus 1. A plurality of contents and contents-related information associated with each of the plurality of contents are stored in the contents DB 4. Incidentally, the contents are a mass of information containing a plurality of pieces of data. The contents-related information is information such as a contents file name, contents size information (total data capacity) and a contents creator name. Terminal IDs for identifying the terminals 3a and 3b and the phone numbers of the mobile terminals 3a and 3b are stored in the terminal information DB 5 while the terminal IDs are associated with the phone numbers of the terminals 3a and 3b. Incidentally, the contents DB 4 and the terminal information DB 5 may be included in the data transfer apparatus 1.

Incidentally, description will be made with an English lowercase character attached to each of the members, e.g. like mobile terminal 3a, only when members having the same function must be particularly distinguished from one another. When members having the same function need not be particularly distinguished from one another or are named generically, description will be made with no English lowercase character attached to each of the members, e.g. like mobile terminal 3.

Configuration of Data Transfer Apparatus

The data transfer apparatus 1 includes a registration portion 11, a destination point recording portion 12, a transmission information recording portion 13, an arithmetic operation portion 14, a timer 15, an occupied transfer rate calculating portion 16 and a data transmitting portion 17.

The registration portion 11 receives route information transmitted from a mobile terminal 3. The route information used herein is information expressing a route from a starting point of a user carrying the mobile terminal 3 to a destination point. That is, the route information includes a terminal ID of the mobile terminal 3, starting point information expressing a position of the starting point of the user, way point information expressing a position of each way point of the user, and destination point information expressing a position of the destination point of the user. The registration portion 11 registers the received route information into the destination point recording portion 12.

Moreover, the registration portion 11 receives contents request information transmitted from the mobile terminal 3. The contents request information used herein includes the terminal ID of the mobile terminal 3 and a file name of contents that the user desires to download. The registration portion 11 accesses the contents DB 4 to thereby acquire size information of the contents from the contents DB 4 based on the file name of the contents. The registration portion 11 registers the received contents request information together with the acquired contents size information into the transmission information recording portion 13.

After the registration portion 11 has registered the route information in the destination point recording portion 12 and has registered the contents request information and the contents size information in the transmission information recording portion 13, the registration portion 11 reports a calculation request event to the arithmetic operation portion 14. The calculation request event is an event for requesting the arithmetic operation portion 14 to calculate an estimated time of arrival and a required data transfer rate. Incidentally, the estimated time of arrival is an estimated time that the user of the mobile terminal 3 will arrive at the destination point. The required data transfer rate is a transfer rate necessary for the mobile terminal 3 to complete download of untransmitted data before the user of the mobile terminal 3 arrives at the destination point.

FIG. 2 is a table showing an example of data recorded on the destination point recording portion 12 according to the embodiment. As shown in FIG. 2, the terminal ID, the travel route, the current position, the time of acquisition of the current position, and the estimated time of arrival are recorded on the destination point recording portion 12. Incidentally, the current position, the time of acquisition of the current position and the estimated time of arrival in the destination point recording portion 12 are registered by the arithmetic operation portion 14, as will be described later. When, for example, the mobile terminal 3 is an IP phone, the terminal ID used herein is an IP address or an MAC address. In the example shown in FIG. 2, "Id001" is recorded in the "terminal ID" field. Incidentally, in this embodiment, the terminal ID "Id001" is the terminal ID of the mobile terminal 3a.

The travel route is a route from the starting point of the user carrying the mobile terminal 3a to the destination point. The travel route is designated by latitude information and longitude information. In the example shown in FIG. 2, the user carrying the mobile terminal 3a starts from a starting point S "idoS, keidoS", passes through a way point C "idoC, keidoC" and a way point D "idoD, keidoD", and moves to a destination point A "idoA, keidoA" which is a destination of the travel.

The current position expresses the current position of the mobile terminal 3a. The time of acquisition of the current position is a time point that the current position information expressing the current position of the mobile terminal 3a was acquired. That is, in the example shown in FIG. 2, the user of the mobile terminal 3a is located at a way point S1 "idoS1, keidoS1" at a time point 9:32. In addition, "10:13" is recorded in the "estimated time of arrival" field. Incidentally, although only time points are recorded as the time of acquisition of the current position and the estimated time of arrival in the example shown in FIG. 2, these time points may be recorded, for example, together with dates.

FIG. 3 is a table showing an example of data recorded on the transmission information recording portion 13 according to the embodiment. As shown in FIG. 3, a terminal ID, a file name, a size, an untransmitted size, a required data transfer rate and an occupied data transfer rate have been recorded on the transmission information recording portion 13. Incidentally, the required data transfer rate in the transmission information recording portion 13 is registered by the arithmetic operation portion 14, as will be described later. In addition, the occupied data transfer rate in the transmission information recording portion 13 is registered by the occupied data transfer rate calculating portion 16, as will be described later. The file name used herein expresses a file name of contents to be transmitted to the mobile terminal 3a.

The size expresses a total data capacity of the contents to be transmitted to the mobile terminal 3a. The untransmitted size expresses a data capacity of untransmitted data which have not been downloaded by the mobile terminal 3a yet, of the contents to be transmitted to the mobile terminal 3a. Incidentally, in the example shown in FIG. 3, the size and the untransmitted size are expressed in megabyte (MB). That is, in the example shown in FIG. 3, data of 4.9 MB in contents of "File A" having a total data capacity of 45 MB have been downloaded already by the mobile terminal 3a but the residual untransmitted data of 40.1 MB have not been downloaded by the mobile terminal 3a yet. Incidentally, the required data transfer rate and the occupied data transfer rate are expressed in KB/s. That is, in the example shown in FIG. 3, 16.3 KB/s has been recorded in each of the "required data transfer rate" field and the "occupied data transfer rate" field.

The arithmetic operation portion 14 calculates an estimated time of arrival and a required data transfer rate in accordance with a calculation request event reported by the registration portion 11, registers the calculated estimated time of arrival into the destination point recording portion 12, and registers the calculated required data transfer rate into the transmission information recording portion 13. Therefore, the arithmetic operation portion 14 includes an arrival time calculating portion 14a, and a required transfer rate calculating portion 14b.

The arrival time calculating portion 14a calculates an estimated time of arrival. The estimated time of arrival is an estimated time that the user of the mobile terminal 3 will arrive at the destination point. Specifically, the arrival time calculating portion 14a first extracts the terminal ID of the mobile terminal 3 from the calculation request event reported by the registration portion 11. The arrival time calculating portion 14a accesses the terminal information DB 5 to thereby acquire the phone number of the mobile terminal 3 from the terminal information DB 5 based on the extracted terminal ID.

The arrival time calculating portion 14a accesses the position information service center 2 to thereby acquire current position information expressing the current position of the mobile terminal 3 from the position information service center 2 based on the acquired phone number. On this occasion, the arrival time calculating portion 14a acquires current time information expressing the current time from a time measuring unit (not shown) provided in the data transfer apparatus 1. Incidentally, the time measuring unit has a function of measuring the current time. For example, the time measuring unit includes an RTC (Real Time Clock).

The arrival time calculating portion 14a calculates a latest moving velocity of the mobile terminal 3 based on the current position information and the current time information acquired at the previous time and the current position and the current time information acquired at this time. Incidentally, when, for example, the user carrying the mobile terminal 3 intends to begin to move from the starting point, that is, when there is neither current position information nor current time information acquired at the previous time, the arrival time calculating portion 14a uses "30 km/h" preset as a default moving velocity of the mobile terminal 3.

The arrival time calculating portion 14a calculates an estimated time of arrival based on the latest moving velocity of the mobile terminal 3 and a distance from the current position of the mobile terminal 3 to the destination point. Specifically, the arrival time calculating portion 14a calculates an estimated time of arrival in accordance with the following (Expression 1). Incidentally, the distance from the current position of the mobile terminal 3 to the destination point is measured by a well-known measurement method such as spherical trigonometry. The arrival time calculating portion 14a registers the calculated estimated time of arrival, together with the current position information expressing the current position of the mobile terminal 3 and the time of acquisition of the current position (current time), into the destination point recording portion 12.

Estimated Time of Arrival=Current Time+(Distance from Current Position of Mobile Terminal to Destination Point÷Moving Velocity of Mobile Terminal)  Expression 1

The required transfer rate calculating portion 14b calculates a required data transfer rate which is necessary for the mobile terminal 3 to complete download of untransmitted data before the user of the mobile terminal 3 arrives at the destination point. Specifically, the required transfer rate calculating portion 14b first acquires an untransmitted size recorded on the transmission information recording portion 13 in accordance with the calculation request event reported by the registration portion 11. The required transfer rate calculating portion 14b calculates a required data transfer rate based on a time obtained by subtracting the current time from the estimated time of arrival calculated by the arrival time calculating portion 14a and the untransmitted size of the untransmitted data. Specifically, the required transfer rate calculating portion 14b calculates a required data transfer rate in accordance with the following (Expression 2). The required transfer rate calculating portion 14b registers the calculated required data transfer rate into the transmission information recording portion 13.

Required Data Transfer Rate=Untransmitted Size÷(Estimated Time of Arrival−Current Time)  Expression 2

After the arithmetic operation portion 14 has registered the estimated time of arrival in the destination point recording portion 12 and has registered the required data transfer rate in the transmission information recording portion 13, the arithmetic operation portion 14 sets a time point (timer value) in the timer 15 so that the arithmetic operation portion 14 will calculate an estimated time of arrival and a required data transfer rate next time at the time point set in the timer 15. In the embodiment, the arithmetic operation portion 14 sets a timer value for each mobile terminal 3. In addition, after the arithmetic operation portion 14 has registered the estimated time of arrival in the destination point recording portion 12 and has registered the required data transfer rate in the transmission information recording portion 13, the arithmetic operation portion 14 reports an assignment request event to the occupied transfer rate calculating portion 16. The assignment request event is an event for requesting the occupied transfer rate calculating portion 16 to calculate an occupied data transfer rate to be really used.

The timer 15 counts the set timer value. When the set timer value reaches "0", the timer 15 reports a calculation request event (timer event) to the arithmetic operation portion 14.

The occupied transfer rate calculating portion 16 assigns required bandwidths for achievement of required data transfer rates to a plurality of mobile terminals 3 respectively in order of estimated time of arrival to prevent the sum of the required bandwidths from exceeding a required total bandwidth for achievement of the maximum data transfer rate of the communication line N, so that the occupied transfer rate calculating portion 16 calculates the occupied data transfer rates to be really used respectively for the plurality of mobile terminals 3 based on the assigned required bandwidths.

Incidentally, the maximum data transfer rate of the communication line N has been recorded in advance in a memory not shown but provided in the occupied transfer rate calculating portion 16. In the embodiment, the maximum data transfer rate of the transmission line N is "30 KB/s". Specifically, the occupied transfer rate calculating portion 16 first acquires the estimated time of arrival recorded on the destination point recording portion 12 in accordance with the assignment request event reported by the arithmetic operation portion 14.

Moreover, the occupied transfer rate calculating portion 16 acquires the required data transfer rate recorded on the transmission information recording portion 13, in accordance with the assignment request event reported by the arithmetic operation portion 14. The occupied transfer rate calculating portion 16 assigns required bandwidths for achievement of required data transfer rates to a plurality of mobile terminals 3 respectively in order of estimated time of arrival to prevent the sum of the required bandwidths from exceeding a required total bandwidth for achievement of the maximum data transfer rate of the communication line N.

When the remaining bandwidth in the total bandwidth of the communication line N is less than a required bandwidth for achievement of the required data transfer rate to be assigned, the occupied transfer rate calculating portion 16 assigns the remaining bandwidth in the total bandwidth of the communication line N, to the mobile terminal 3. The occupied transfer rate calculating portion 16 assigns a bandwidth "0" to any mobile terminal 3 following this mobile terminal 3. The occupied transfer rate calculating portion 16 calculates occupied data transfer rates based on the bandwidths assigned to the plurality of mobile terminals 3 respectively. The occupied transfer rate calculating portion 16 registers the calculated occupied data transfer rates into the transmission information recording portion 13.

The data transmitting portion 17 extracts pieces of untransmitted data respectively from a plurality of contents as transmission targets. The data transmitting portion 17 transmits the extracted pieces of untransmitted data to the plurality of mobile terminals 3 respectively through the communication line N. Specifically, the data transmitting portion 17 first acquires the occupied data transfer rates recorded on the transmission information recording portion 13, for the mobile terminals 3 respectively. In addition, the data transmitting portion 17 accesses the contents DB 4 to extract pieces of untransmitted data transmittable in one second from the respective contents as the transmission targets. The data transmitting portion 17 transmits the extracted pieces of untransmitted data to the plurality of mobile terminals 3 respectively through the communication line N in accordance with the occupied data transfer rates. Incidentally, when any of the mobile terminals 3 has completed download of contents, the data transmitting portion 17 reports an assignment request event to the occupied transfer rate calculating portion 16.

The aforementioned data transfer apparatus 1 can be also achieved by a program installed into any computer such as a personal computer. That is, the registration portion 11, the arithmetic operation portion 14, the timer 15, the occupied transfer rate calculating portion 16 and the data transmitting portion 17 are embodied by a CPU of the computer which operates in accordance with the program for implementing these functions. Accordingly, the program for implementing the functions of the registration portion 11, the arithmetic operation portion 14, the timer 15, the occupied transfer rate calculating portion 16 and the data transmitting portion 17, or a recording medium having the program recorded thereon is also an embodiment of the invention. In addition, the destination point recording portion 12 and the transmission information recording portion 13 are embodied by a storage device built in the computer or a storage device accessible from the computer.

Example of Operation of Respective Portions of Data Transfer Apparatus 1

Next, an example of operation of the respective portions of the data transfer apparatus 1 according to the aforementioned configuration will be described.

Figure 4:
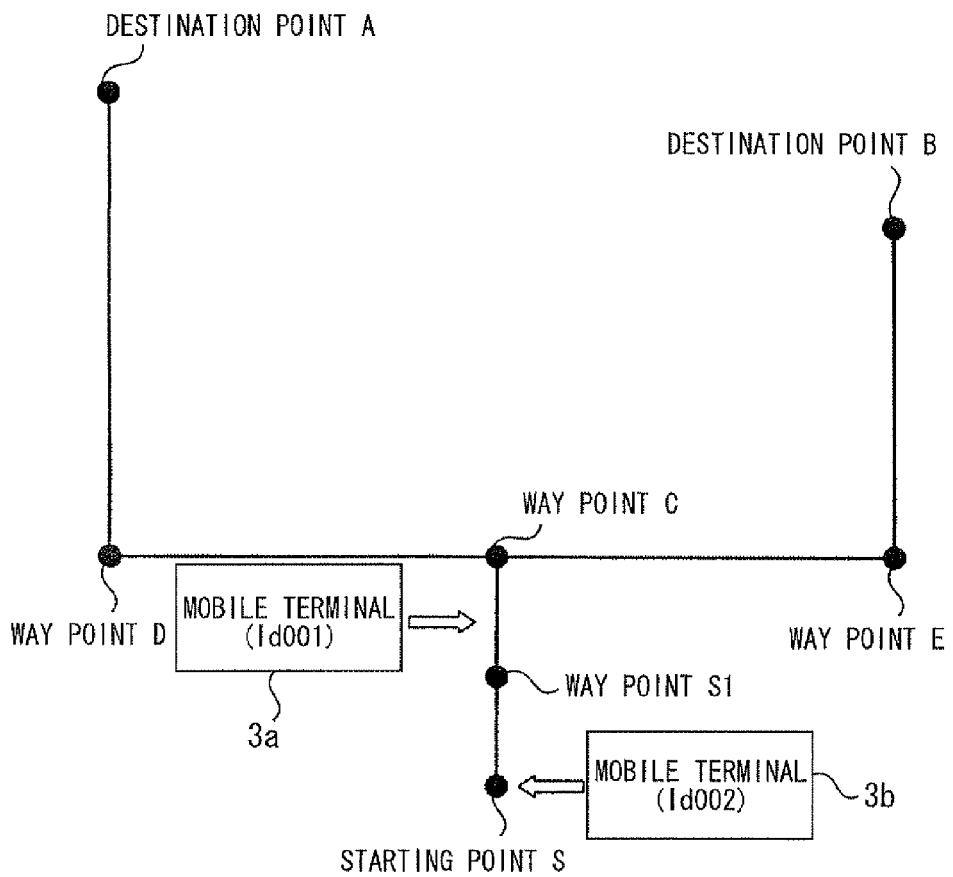
FIG. 4 is a view showing current positions of mobile terminals at a time point of 9:35.

The case where the user carrying the mobile terminal 3a with the terminal ID "Id001" starts from the starting point S, passes through the way point C and the way point D and moves to the destination point A which is a destination of travel, as shown in FIG. 4, will be described below by way of example. The case where a user carrying the mobile terminal 3b with a terminal ID "Id002" starts also from the starting point S but at a time later than the user of the terminal mobile 3a, passes through the way point C and a way point E, and moves to a destination point B which is a destination of travel on this occasion will be described.

FIG. 4 is a view showing the current position of the mobile terminal 3a and the current position of the mobile terminal 3b at a time point 9:35. As shown in FIG. 4, the user of the mobile terminal 3b is located at the starting point S at the time point 9:35. Incidentally, FIG. 2 and FIG. 3 are tables showing examples of data recorded on the destination point recording portion 12 and the transmission information recording portion 13 at the time point 9:32. That is, the route information of the mobile terminal 3a has been recorded on the destination point recording portion 12 and the contents request information of the mobile terminal 3a has been recorded on the transmission information recording portion 13. However, route information and contents request information of the mobile terminal 3b have not been recorded on the destination point recording portion 12 and the transmission information recording portion 13.

Incidentally, as an example shown in FIG. 4, the distance between the starting point S and the way point C is 5 km, the distance between the way point C and the way point D is 8 km, the distance between the way point D and the destination point A is 10 km, the distance between way point C and the way point E is 8 km, and the distance between the way point E and the destination point B is 7 km.

Example of Operation of Registration Portion 11

Figure 5:
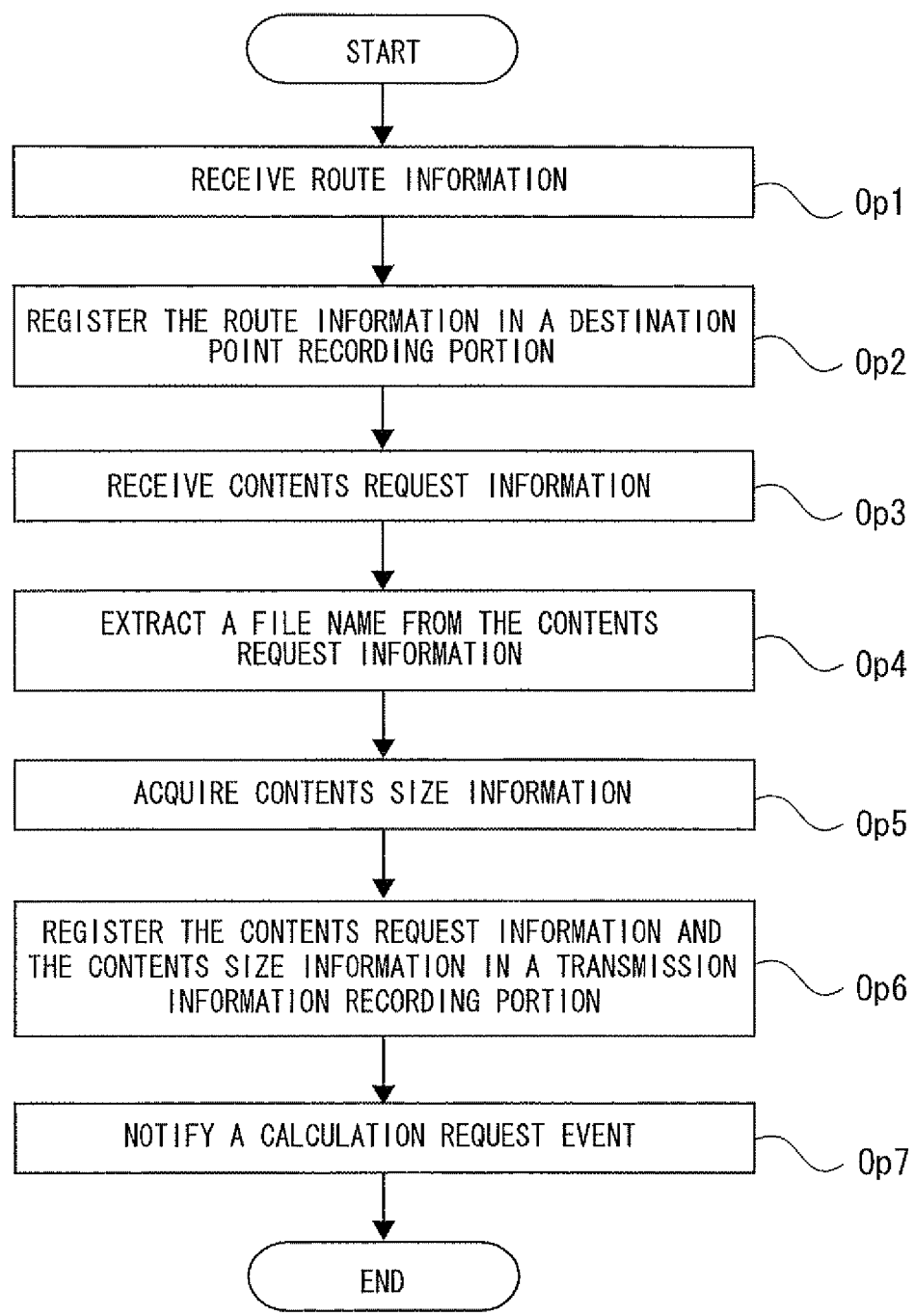
FIG. 5 is a flow chart showing an example of operation of a registration portion.

FIG. 5 is a flow chart showing an example of operation of the registration portion 11 according to the embodiment. In the aforementioned case, the registration portion 11 first receives route information transmitted from the mobile terminal 3b (Op1). When the user of the mobile terminal 3b has entered "Id002" in the "terminal ID" field, "idoS, keidoS" in the "starting point" field, "idoC, keidoC" and "idoE, keidoE" in the "way point" field, and "idoB, keidoB" in the "destination point" field in a registration screen displayed on a display screen of the mobile terminal 3b and has pushed a "Register" button B1, for example, as shown in FIG. 6, the route information is transmitted as an HTTP request to the data transfer apparatus 1.

Figure 6:
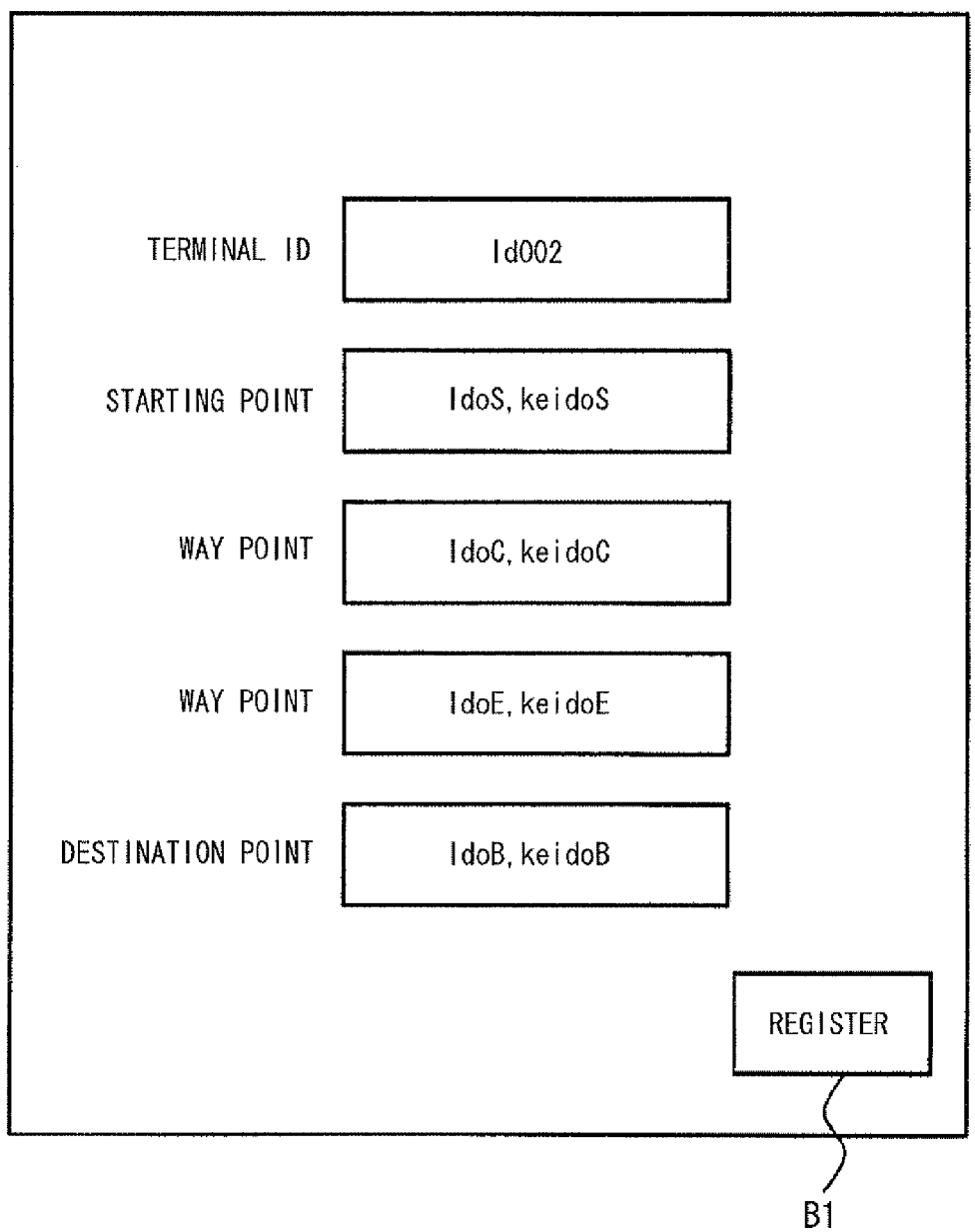
FIG. 6 is a view showing an example of a registration screen displayed on a display screen of a mobile terminal and provided for entering route information.

Incidentally, although the example shown in FIG. 6 has been described on the case where the user of the mobile terminal 3b enters the starting port, the way points and the destination point, the invention is not limited thereto. For example, configuration may be made so that the user of the mobile terminal 3b selects one from a plurality of travel routes which are calculated automatically by a CPU of the mobile terminal 3b based on the starting point and the destination point entered by the user of the mobile terminal 3b.

The registration portion 11 registers the route information received in Op1 in the destination point recording portion 12 (Op2). FIG. 7 is a table showing an example of data of the destination point recording portion 12 containing the route information registered in Op2. As shown in FIG. 7, a terminal ID "Id002" and a travel route "idoS, keidoS", "idoC, keidoC", "idoE, keidoE", "idoB, keido B" in addition to the data shown in FIG. 2 have been recorded on the destination point recording portion 12.

Figure 8:
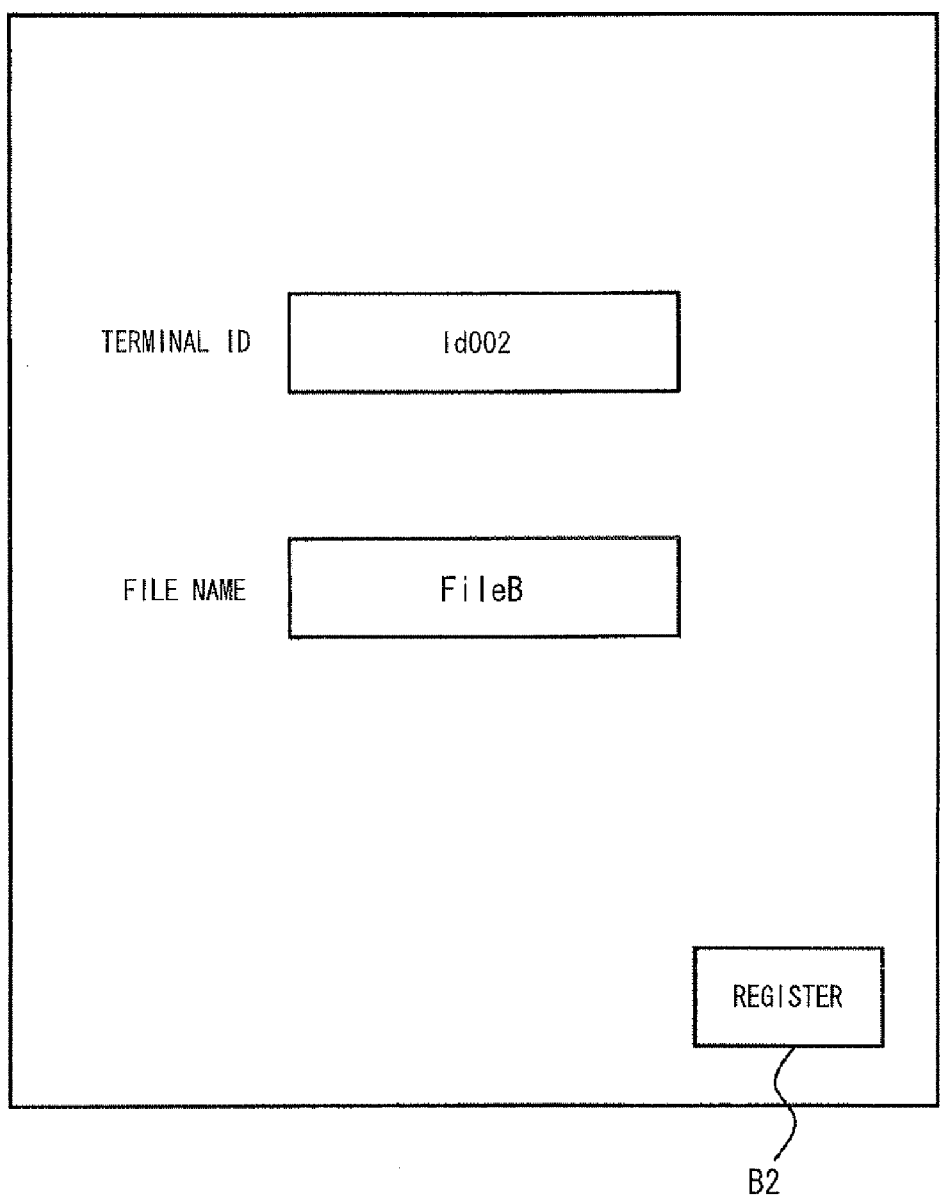
FIG. 8 is a view showing an example of a registration screen displayed on a display screen of a mobile terminal and provided for entering contents request information.

In addition, the registration portion 11 receives contents request information transmitted from the mobile terminal 3b (Op3). When the user of the mobile terminal 3b has entered "Id002" in the "terminal ID" field and "File B" in the "file name" field and pushed a "Register" button B2, for example, as shown in FIG. 8, the contents request information is transmitted as an HTTP request to the data transfer apparatus 1. The registration portion 11 extracts the file name "File B" from the contents request information received in Op3 (Op4). The registration portion 11 accesses the contents DB 4 to acquire contents size information "30 MB" of the "File B" stored in the contents DB 4 based on the file name "File B" extracted in Op4 (Op5).

The registration portion 11 registers the contents request information received in Op3, together with the contents size information acquired in Op5, in the transmission information recording portion 13 (Op6). FIG. 9 is a table showing an example of data of the transmission information recording portion 13 containing the contents request information and the contents size information registered in Op6. As shown in FIG. 9, a terminal ID "Id002", a file name "File B", a size "30 MB" and an untransmitted size "30 MB" in addition to the data shown in FIG. 3 have been recorded on the transmission information recording portion 13. Incidentally, the untransmitted size of the mobile terminal 3a with the terminal ID "IdO01" has been updated from "40.1 MB" to "37.2 MB" at the time point 9:35.

The registration portion 11 reports a calculation request event to the arithmetic operation portion 14 (Op7).

Example of Operation of Arithmetic Operation Portion 14 at Current Time "9:35"

Figure 10:
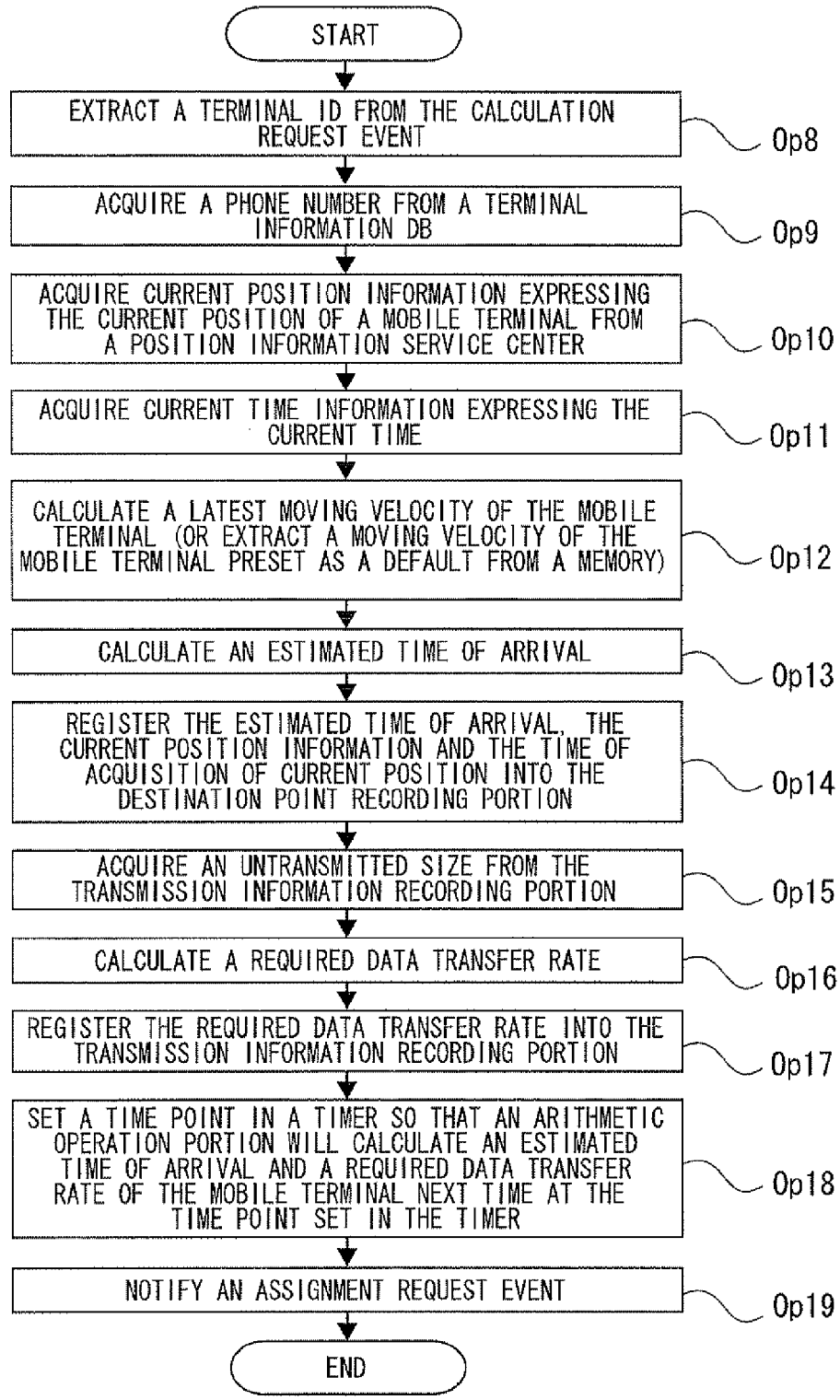
FIG. 10 is a flow chart showing an example of operation of an arithmetic operation portion.

FIG. 10 is a flow chart showing an example of operation of the arithmetic operation portion 14 according to the embodiment. That is, after Op7 shown in FIG. 5, the arrival time calculating portion 14a of the arithmetic operation portion 14 extracts the terminal ID "Id002" of the mobile terminal 3b from the calculation request event reported by the registration portion 11 (Op8).

The arrival time calculating portion 14a accesses the terminal information DB 5 to acquire the phone number of the mobile terminal 3b from the terminal information DB 5 based on the terminal ID extracted in Op8 (Op9). The arrival time calculating portion 14a accesses the position information service center 2 to acquire current position information expressing the current position of the mobile terminal 3b from the position information service center 2 based on the phone number of the mobile terminal 3b acquired in Op9 (Op10).

In the embodiment, the user carrying the mobile terminal 3b is located at the starting point S, so that the arrival time calculating portion 14a acquires current position information expressing the current position "idoS, keidoS" of the mobile terminal 3b from the position information service center 2. On this occasion, the arrival time calculating portion 14a acquires current time information expressing the current time "9:35" from the time measuring unit (not shown) provided in the data transfer apparatus 1 (Op11).

The arrival time calculating portion 14a calculates a latest moving velocity of the mobile terminal 3b based on the current position information and the current time information acquired at the previous time and the current position information and the current time information acquired at this time (Op12). In the embodiment, since the user carrying the mobile terminal 3b intends to begin to move from the starting point S, both current position information and current time information acquired at the previous time do not exist. For this reason, the arrival time calculating portion 14a extracts "30 km/h" preset as a default moving velocity of the mobile terminal 3b, from a memory not shown (Op12).

The arrival time calculating portion 14a calculates an estimated time of arrival based on the latest moving velocity of the mobile terminal 3b extracted in Op12 and a distance from the current position (starting point S) of the mobile terminal 3b expressed by the current position information acquired in Op10 to the destination point B (Op13). Specifically, the arrival time calculating portion 14a first calculates a distance between the current position (starting point S) of the mobile terminal 3b and the destination point B.

In the example shown in FIG. 4, since the distance between the starting point S and the way point C is 5 km, the distance between the way point C and the way point E is 8 km, and the distance between the way point E and the destination point B is 7 km, the arrival time calculating portion 14a calculates that the distance between the current position (starting point S) of the mobile terminal 3b and the destination point B is "20 km". The distance "20 km" between the current position (starting point S) of the mobile terminal 3b and the destination point B, the current time "9:35" and the moving velocity "30 km/h" of the mobile terminal 3b are assigned into the aforementioned (Expression 1), so that the arrival time calculating portion 14a calculates that the estimated time of arrival of the mobile terminal 3b is "10:15".

The arrival time calculating portion 14a registers the estimated time of arrival calculated in Op13, together with the current position information expressing the current position of the mobile terminal 3b and a time of acquisition of the current position (current time), into the destination point recording portion 12 (Op14). FIG. 11 is a table showing an example of data of the destination point recording portion 12 containing the estimated time of arrival, the current position information and the time of acquisition of the current position registered in Op14. As shown in FIG. 11, the current position "idoS, keidoS", the time "9:35" of acquisition of the current position and the estimated time "10:15" of arrival have been recorded for the terminal ID "Id002" on the destination point recording portion 12.

In addition, the required transfer rate calculating portion 14b of the arithmetic operation portion 14 acquires "30 MB" recorded as an untransmitted size of the mobile terminal 3b on the transmission information recording portion 13, in accordance with the calculation request event reported by the registration portion 11 (Op15). The required transfer rate calculating portion 14b calculates a required data transfer rate based on a time obtained by subtracting the current time from the estimated time of arrival calculated in Op13 and the untransmitted size acquired in Op15 (Op16). The untransmitted size "30 MB", the estimated time "10:15" of arrival and the current time "9:35" are assigned into the aforementioned (Expression 2), so that the required transfer rate calculating portion 14b calculates that the required data transfer rate of the mobile terminal 3b is "12.5 KB/s".

The required transfer rate calculating portion 14b registers the required data transfer rate calculated in Op16, into the transmission information recording portion 13 (Op17). FIG. 12 is a table showing an example of data of the transmission information recording portion 13 containing the required data transfer rate registered in Op17. As shown in FIG. 12, the required data transfer rate "12.5 KB/s" has been recorded for the terminal ID "Id002" on the transmission information recording portion 13.

The arithmetic operation portion 14 sets a time point (timer value) in the timer 15 so that the arithmetic operation portion 14 will calculate an estimated time of arrival and a required data transfer rate of the mobile terminal 3b next time at the time point set in the timer 15 (Op18). In the embodiment, the arithmetic operation portion 14 sets a timer value of the mobile terminal 3b to "5 min" in the timer 15. In this manner, the timer 15 can report a calculation request event to the arithmetic operation portion 14 at "9:40" which is 5 min later than the current time "9:35". The arithmetic operation portion 14 reports an assignment request event to the occupied transfer rate calculating portion 16 (Op19).

Example of Operation of Occupied Transfer Rate Calculating Portion 16 in Current Time "9:35"

Figure 13:
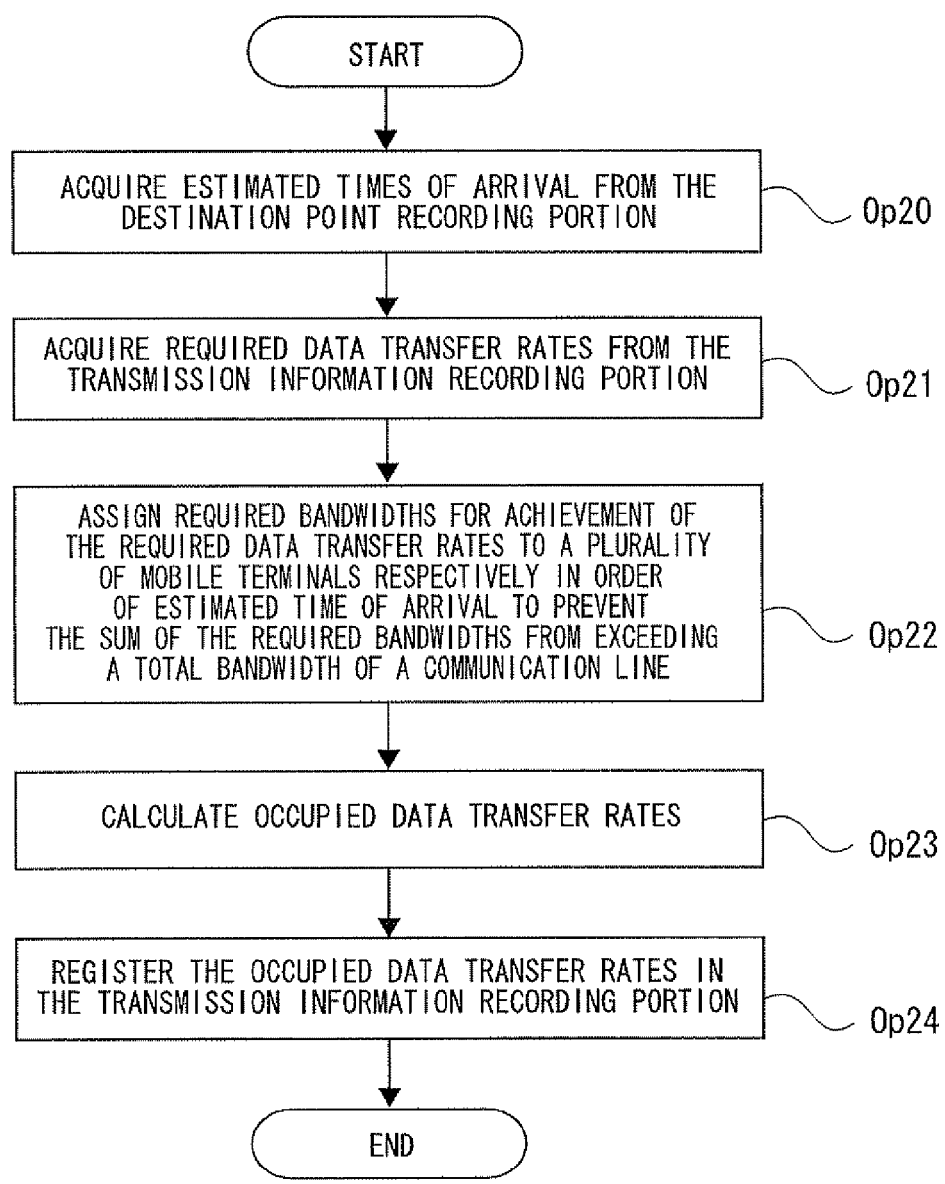
FIG. 13 is a flow chart showing an example of operation of an occupied transfer rate calculating portion.

FIG. 13 is a flow chart showing an example of operation of the occupied transfer rate calculating portion 16 according to the embodiment. That is, after Op19 shown in FIG. 10, the occupied transfer rate calculating portion 16 acquires estimated times of arrival recorded on the destination point recording portion 12, in accordance with the assignment request event reported by the arithmetic operation portion 14 (Op20). In the embodiment, the occupied transfer rate calculating portion 16 acquires an estimated time "10:13" of arrival of the mobile terminal 3a and an estimated time "10:15" of arrival of the mobile terminal 3b which have been recorded on the destination point recording portion 12.

In addition, the occupied transfer rate calculating portion 16 acquires required data transfer rates which have been recorded on the transmission information recording portion 13, in accordance with the assignment request event reported by the arithmetic operation portion 14 (Op21). In the embodiment, the occupied transfer rate calculating portion 16 acquires a required data transfer rate "16.3 KB/s" of the mobile terminal 3a and a required data transfer rate "12.5 KB/s" of the mobile terminal 3b which have been recorded on the transmission information recording portion 13.

The occupied transfer rate calculating portion 16 assigns required bandwidths for achievement of the required data transfer rates to the mobile terminals 3a and 3b in order of estimated time of arrival to prevent the sum of the required bandwidths from exceeding the required total bandwidth for achievement of the maximum data transfer rate of the communication line N (Op22). In the embodiment, the maximum data transfer rate of the communication line N used herein is "30 KB/s".

In addition, in the embodiment, the sum of the required data transfer rate "16.3 KB/s" of the mobile terminal 3a and the required data transfer rate "12.5 KB/s" of the mobile terminal 3b is "28.8 KB/s" which does not exceed the maximum data transfer rate "30 KB/s". Accordingly, the occupied transfer rate calculating portion 16 assigns a required bandwidth for achievement of the required data transfer rate "16.3 KB/s" directly to the mobile terminal 3a. In addition, the occupied transfer rate calculating portion 16 assigns a required bandwidth for achievement of the required data transfer rate "12.5 KB/s" directly to the mobile terminal 3b.

The occupied transfer rate calculating portion 16 calculates occupied data transfer rates based on the bandwidths assigned to the mobile terminals 3a and 3b respectively (Op23). In the embodiment, since the occupied transfer rate calculating portion 16 assigns the required bandwidth for achievement of the required data transfer rate "16.3 KB/s" directly to the mobile terminal 3a, the occupied transfer rate calculating portion 16 calculates that the occupied data transfer rate of the mobile terminal 3a is "16.3 KB/s". In the embodiment, since the occupied transfer rate calculating portion 16 assigns the required bandwidth for achievement of the required data transfer rate "12.5 KB/s" directly to the mobile terminal 3b, the occupied transfer rate calculating portion 16 calculates that the occupied data transfer rate of the mobile terminal 3b is "12.5 KB/s".

The occupied transfer rate calculating portion 16 registers the calculated occupied data transfer rates into the transmission information recording portion 13 (Op24). FIG. 14 is a table showing an example of data of the transmission information recording portion 13 containing the occupied data transfer rates registered in Op24. As shown in FIG. 14, the occupied data transfer rates "16.3 KB/s" and "12.5 KB/s" have been recorded for the terminal IDs "Id001" and "Id002" respectively on the transmission information recording portion 13.

Example of Operation of Data Transmitting Portion 17

Figure 15:
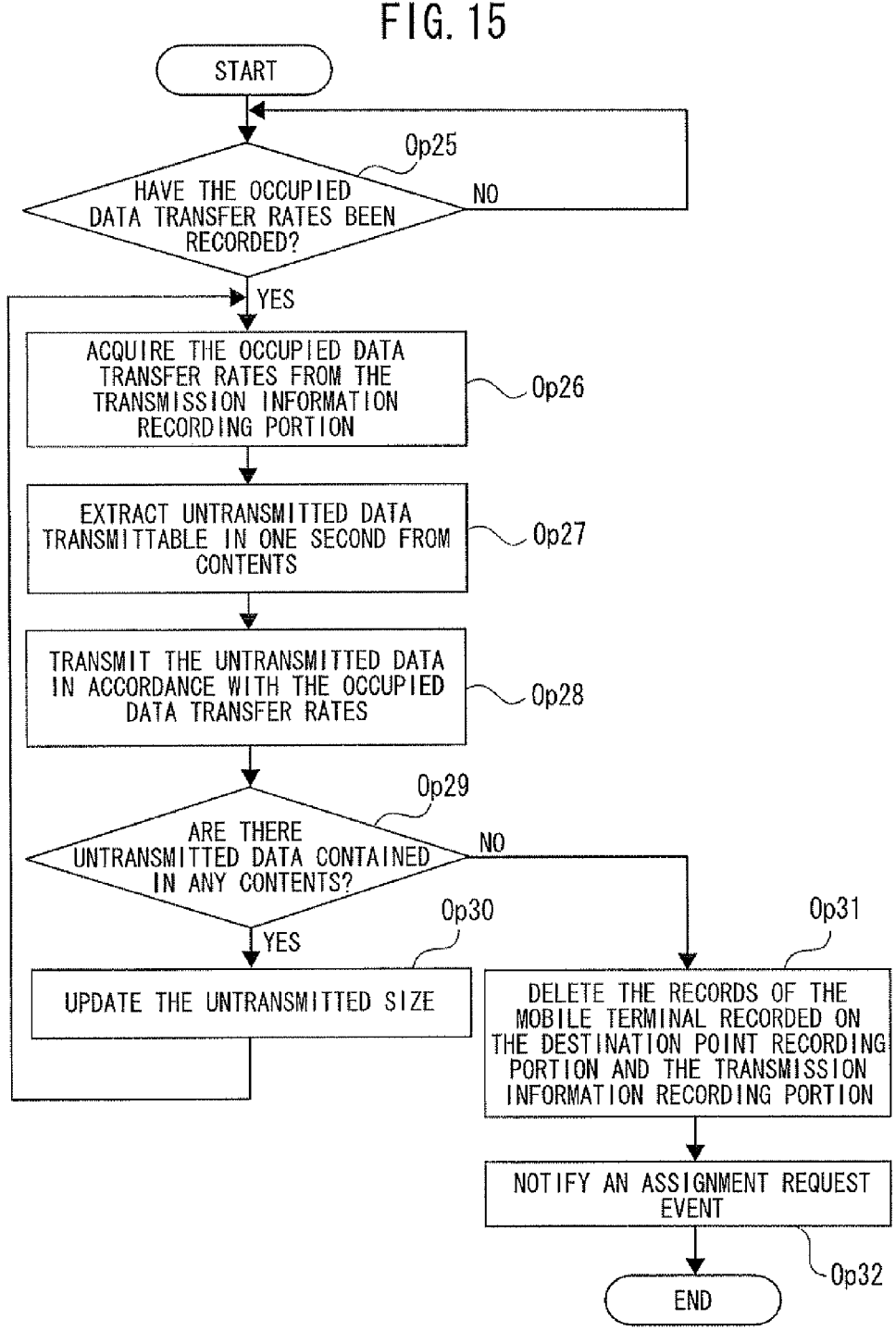
FIG. 15 is a flow chart showing an example of operation of a data transmitting portion.

FIG. 15 is a flow chart showing an example of operation of the data transmitting portion 17 according to the embodiment. That is, after Op24 shown in FIG. 13, the data transmitting portion 17 first judges whether or not the occupied data transfer rates have been recorded on the transmission information recording portion 13 (Op25). When the data transmitting portion 17 decides that the occupied data transfer rates have been recorded on the transmission information recording portion 13 (YES in Op25), the data transmitting portion 17 acquires the occupied data transfer rates from the transmission information recording portion 13 (Op26). In the embodiment, the data transmitting portion 17 acquires the occupied data transfer rate "16.3 KB/s" of the mobile terminal 3a and the occupied data transfer rate "12.5 KB/s" of the mobile terminal 3b from the transmission information recording portion 13. On the other hand, when the data transmitting portion 17 decides that the occupied data transfer rates have not recorded on the transmission information recording portion 13 (NO in Op25), the routine of processing goes back to Op25.

The data transmitting portion 17 accesses the contents DB 4 to extract untransmitted data transmittable in one second from the contents as transmission targets (Op27). In the embodiment, the data transmitting portion 17 extracts untransmitted data of "16.3 KB" transmittable in one second, from the untransmitted data with the untransmitted size "37.2 MB" in the contents of "File A" with a total data capacity 45 MB. In addition, the data transmitting portion 17 extracts untransmitted data of "12.5 KB" transmittable in one second, from the untransmitted data with the untransmitted size "30 MB" in the contents of "File B" with a total data capacity 30 MB.

The data transmitting portion 17 transmits these pieces of untransmitted data extracted in Op27 to the mobile terminals 3a and 3b respectively in accordance with the occupied data transfer rates acquired in Op26 through the communication line N (Op28). In the embodiment, the data transmitting portion 17 transmits the untransmitted data of "16.3 KB" in the "File A" to the mobile terminal 3a in accordance with the occupied data transfer rate "16.3 KB/s" through the communication line N. In addition, the data transmitting portion 17 transmits the untransmitted data of "12.5 KB" in the "File B" to the mobile terminal 3b in accordance with the occupied data transfer rate "12.5 KB/s" through the communication line N. Specifically, when the data transmitting portion 17 transmits untransmitted data transmittable in one second to each of the mobile terminals and the transmission time is not longer than one second, the data transmitting portion 17 sleeps in terms of processing until one second elapses so that the untransmitted data transmittable in one second are transmitted in one second surely.

The data transmitting portion 17 judges whether or not untransmitted data are contained in any contents as a transmission target stored in the contents DB 4 (Op29). When the data transmitting portion 17 decides that untransmitted data are contained in the contents (YES in Op29), the data transmitting portion 17 updates the untransmitted size recorded on the transmission information recording portion 13 (Op30). After the untransmitted size has been updated in Op30, the routine of processing goes back to Op26 in which latest occupied data transfer rates are acquired so that processing is performed repetitively.

On the other hand, when the data transmitting portion 17 decides that untransmitted data are not contained in the contents (NO in Op29), the data transmitting portion 17 decides that the mobile terminal 3 has completed download of the contents, so that the data transmitting portion 17 deletes the records of the mobile terminal 3 which are recorded on the destination point recording portion 12 and the transmission information recording portion 13 and to which transmission of the untransmitted data has been completed (Op31). In this case, the data transmitting portion 17 reports an assignment request event to the occupied transfer rate calculating portion 16 (Op32).

In terms of returning from Op30 to Op26, the routine of processing may return to Op26 after judgment is made as to whether or not latest occupied data transfer rates have been calculated. For example, judgment as to whether or not latest occupied data transfer rates have been calculated depends on judgment as to whether or not a calculation request event as a trigger of calculation of occupied data transfer rates has been issued by the timer 15. When a calculation request event has been issued, the routine of processing returns to Op26 in which latest occupied data transfer rates are acquired. When a calculation request event has not been issued, the routine of processing returns to Op27 in which data to be transmitted next are acquired. In this manner, it is possible to reduce the number of times of executing processing for acquisition of occupied data transfer rates and it is possible to perform data transmission more efficiently.

Example of Operation of Arithmetic Operation Portion 14 in Current Time "9:37"

Figure 16:
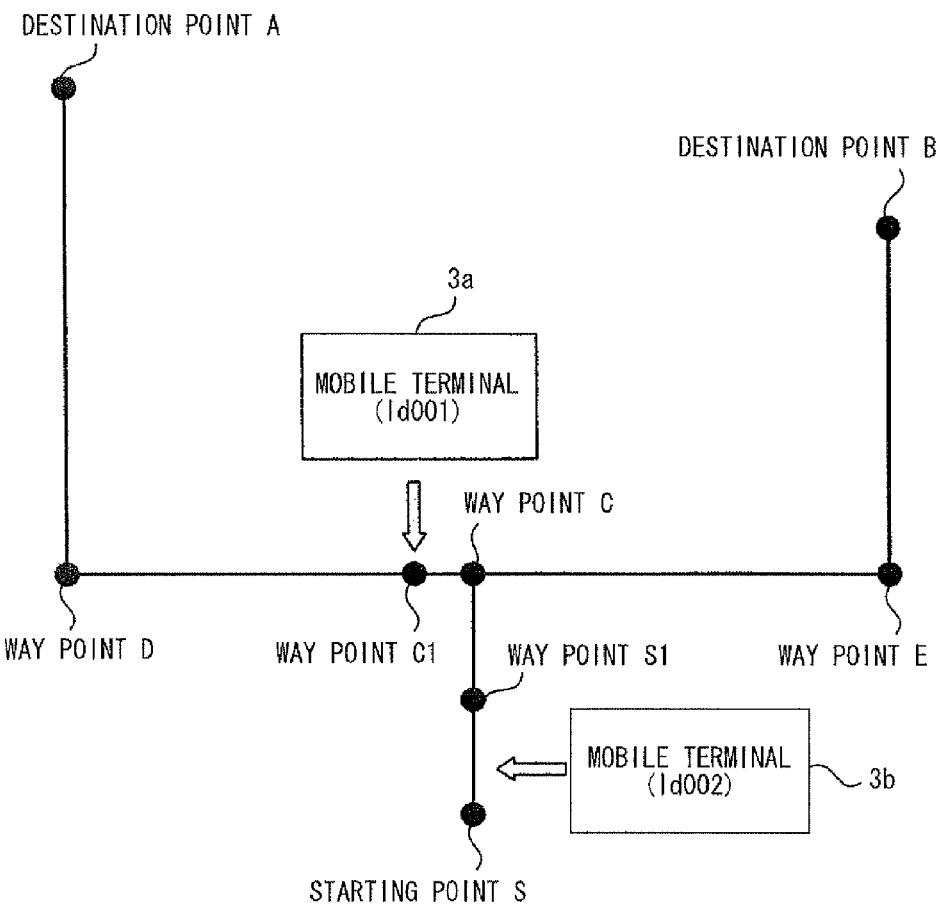
FIG. 16 is a view showing current positions of the mobile terminals at a time point 9:37.

Next, the case where the timer 15 has reported a calculation request event (timer event) for requesting calculation of the estimated time of arrival and the required data transfer rate of the mobile terminal 3a to the arithmetic operation portion 14 at a time point 9:37 will be described. FIG. 16 is a view showing the current position of the mobile terminal 3a and the current position of the mobile terminal 3b at the time point 9:37. As shown in FIG. 16, the user of the mobile terminal 3a is located at the way point C1 at the time point "9:37".

As shown in FIG. 18, the untransmitted sizes recorded on the transmission information recording portion 13 at the time point "9:37" have been updated from "37.2 MB" to "35.2 MB" as the untransmitted size of the mobile terminal 3a, and from "30 MB" to "28.5 MB" as the untransmitted size of the mobile terminal 3b. In addition, the distance between the starting point S and the way point S1 is 2.5 km and the distance between the way point C and the way point C1 is 0.3 km.

Although the example shown in FIG. 16 has described on the case where the user of the mobile terminal 3a is located at the way point C1 at the time point 9:37, whether or not the user of the mobile terminal 3a is really located at the way point C1 is calculated, for example, by the following method. That is, it is often that the current position of the mobile terminal 3b is not really located on any route exactly. In such a case, the data transfer apparatus 1 decides that the mobile terminal 3a is located on a route with the shortest one of perpendicular lines drawn from the current position of the mobile terminal 3a to the respective routes. Incidentally, the method for judging whether or not the user of the mobile terminal 3a is located at any way point is not particularly limited.

As shown in FIG. 10, the arrival time calculating portion 14a extracts the terminal ID "Id001" of the mobile terminal 3a from a calculation request event reported by the timer 15 (Op8). The arrival time calculating portion 14a accesses the terminal information DB 5 to acquire the phone number of the mobile terminal 3a from the terminal information DB 5 based on the terminal ID extracted in Op8 (Op9). The arrival time calculating portion 14a accesses the position information service center 2 to acquire current position information expressing the current position of the mobile terminal 3a from the position information service center 2 based on the phone number of the mobile terminal 3a acquired in Op9 (Op10).

In the embodiment, since the user carrying the mobile terminal 3a is located at the way point C1, the arrival time calculating portion 14a acquires current position information expressing the current position "idoC1, keidoC1" of the mobile terminal 3a from the position information service center 2. On this occasion, the arrival time calculating portion 14a acquires current time information expressing the current time "9:37" from the time measuring unit (not shown) provided in the data transfer apparatus 1 (Op11).

The arrival time calculating portion 14a calculates a latest moving velocity of the mobile terminal 3a based on the current position information and the current time information acquired at the previous time and the current position information and the current time information acquired at this time (Op12). The arrival time calculating portion 14a first calculates a distance between the current position expressed by the current position information acquired at the previous time and the current position expressed by the current position information acquired at this time.

In the embodiment, since the current position of the mobile terminal 3a expressed by the current position information acquired at the previous time is "idoS1, keidoS1" (see FIG. 11), the arrival time calculating portion 14a calculates the distance between the way point S1 and the way point C1. Since the distance between the way point S1 and the way point C is 2.5 km and the distance between the way point C and the way point C1 is 0.3 km in the example shown in FIG. 16, the arrival time calculating portion 14a calculates that the distance between the way point S1 and the way point C1 is "2.8 km". In addition, the arrival time calculating portion 14a calculates a lapsed time from the current time expressed by the current time information acquired at the previous time to the current time expressed by the current time information acquired at this time.

In the embodiment, since the current time expressed by the current time information acquired at the previous time is "9:32" (see FIG. 11), the arrival time calculating portion 14a calculates that the lapsed time from the current time expressed by the current time information acquired at the previous time to the current time expressed by the current time information acquired at this time is "5 min". In this manner, the latest moving velocity of the mobile terminal 3a is expressed by 2.8÷(5÷60). That is, the arrival time calculating portion 14a calculates that the latest moving velocity of the mobile terminal 3a is "33.6 km/h".

The arrival time calculating portion 14a calculates an estimated time of arrival based on the latest moving velocity of the moving terminal 3a calculated in Op12 and a distance from the current position (way point C1) of the mobile terminal 3a expressed by the current position information acquired in Op10 to the destination point A (Op13). Specifically, the arrival time calculating portion 14a first calculates the distance from the current position (way point C1) of the mobile terminal 3a to the destination point A.

In the example shown in FIG. 16, since the distance between the way point C1 and the way point D is 7.7 km and the distance between the way point D and the destination point A is 10 km, the arrival time calculating portion 14a calculates that the distance from the current position (way point C1) of the mobile terminal 3a to the destination point A is "17.7 km". The distance "17.7 km" from the current position (way point C1) of the mobile terminal 3a to the destination point A, the current time "9:37" and the moving velocity "33.6 km/h" of the mobile terminal 3a are assigned into the aforementioned (Expression 1), so that the arrival time calculating portion 14a calculates that the estimated time of arrival of the mobile terminal 3a is "10:09".

The arrival time calculating portion 14a registers the estimated time of arrival calculated in Op13, together with the current position information expressing the current position of the mobile terminal 3a and the time of acquisition of the current position (current time), into the destination point recording portion 12 (Op14). FIG. 17 is a table showing an example of data of the destination point recording portion 12 containing the estimated time of arrival, the current position information and the time of acquisition of the current position which have been registered in Op14. As shown in FIG. 17, the current position "ideC1, keidoC1", the time "9:37" of acquisition of the current position and the estimated time "10:09" of arrival have been recorded for the terminal ID "IdO01" on the destination point recording portion 12.

In addition, the required transfer rate calculating portion 14b acquires the untransmitted size "35.2 MB" of the mobile terminal 3a recorded on the transmission information recording portion 13, in accordance with a calculation request event reported by the timer 15 (Op15). The required transfer rate calculating portion 14b calculates a required data transfer rate based on a time obtained by subtracting the current time from the estimated time of arrival calculated in Op13 and the untransmitted size acquired in Op15 (Op16). The untransmitted size "35.2 MB", the estimated time "10:09" of arrival and the current time "9:37" are assigned into the aforementioned (Expression 2), so that the required transfer rate calculating portion 14b calculates that the required data transfer rate of the mobile terminal 3a is "18.3 KB/s".

The required transfer rate calculating portion 14b registers the required data transfer rate calculated in Op16 into the transmission information recording portion 13 (Op17). FIG. 18 is a table showing an example of data of the transmission information recording portion 13 containing the required data transfer rate which has been registered in Op17. As shown in FIG. 18, the required data transfer rate "18.3 KB/s" has been recorded for the terminal ID "IdO01" on the transmission information recording portion 13.

The arithmetic operation portion 14 sets a time point (timer value) in the timer 15 so that the arithmetic operation portion 14 calculates an estimated time of arrival and a required data transfer rate of the mobile terminal 3a next time at the time point set in the timer 15 (Op18). In the embodiment, the arithmetic operation portion 14 sets the timer value of the mobile terminal 3a to "5 min" in the timer 15. In this manner, the timer 15 can report a calculation request event to the arithmetic operation portion 14 at "9:42" which is 5 minutes later than the current time "9:37". The arithmetic operation portion 14 reports an assignment request event to the occupied transfer rate calculating portion 16 (Op19).

Example of Operation of Occupied Transfer Rate Calculating Portion 1 16 in Current Time "9:37"

After Op19 shown in FIG. 10, the occupied transfer rate calculating portion 16 acquires the estimated times of arrival recorded on the destination point recording portion 12, in accordance with the assignment request event reported by the arithmetic operation portion 14, as shown in FIG. 13 (Op20). In the embodiment, the occupied transfer rate calculating portion 16 acquires the estimated time "10:09" of arrival of the mobile terminal 3a and the estimated time "10:15" of arrival of the mobile terminal 3b which have been recorded on the destination point recording portion 12. In addition, the occupied transfer rate calculating portion 16 acquires the required data transfer rates recorded on the transmission information recording portion 13, in accordance with the assignment request event reported by the arithmetic operation portion 14 (Op21). In the embodiment, the occupied transfer rate calculating portion 16 acquires the required data transfer rate "18.3 KB/s" of the mobile terminal 3a and the required data transfer rate "12.5 KB/s" of the mobile terminal 3b which have been recorded on the transmission information recording portion 13.

The occupied transfer rate calculating portion 16 assigns required bandwidths for achievement of the required data transfer rates respectively to the mobile terminals 3a and 3b in order of estimated time of arrival to prevent the sum of the required bandwidths from exceeding the total bandwidth required for the maximum data transfer rate of the communication line N (Op22). In the embodiment, the maximum data transfer rate of the communication line N used herein is "30 KB/s". Moreover, the sum of the required data transfer rate "18.3 KB/s" of the mobile terminal 3a and the required data transfer rate "12.5 KB/s" of the mobile terminal 3b exceeds the maximum data transfer rate "30 KB/s".

Accordingly, the occupied transfer rate calculating portion 16 directly assigns the required bandwidth for achievement of the required data transfer rate "18.3 KB/s" to the mobile terminal 3a which is earlier one in terms of estimated time of arrival, of the mobile terminals 3a and 3b. In addition, the occupied transfer rate calculating portion 16 assigns a transfer rate "11.7 KB/s" (30 KB/s-18.3 KB/s) expressed as the remaining bandwidth in the total bandwidth, to the mobile terminal 3b which is later one in terms of estimated time of arrival, of the mobile terminals 3a and 3b to prevent the sum of the required bandwidths from exceeding the total bandwidth required for achievement of the maximum data transfer rate "30 KB/s" of the communication line N.

The occupied transfer rate calculating portion 16 calculates occupied data transfer rates based on the bandwidths assigned respectively to the mobile terminals 3a and 3b (Op23). In the embodiment, since the occupied transfer rate calculating portion 16 directly assigns the required bandwidth for achievement of the required data transfer rate "18.3 KB/s" to the mobile terminal 3a, the occupied transfer rate calculating portion 16 calculates that the occupied data transfer rate of the mobile terminal 3a is "18.3 KB/s". In addition, in the embodiment, since the occupied transfer rate calculating portion 16 assigns, to the mobile terminal 3b, the transfer rate "11.7 KB/s" expressed as the remaining bandwidth in the total bandwidth required for achievement of the maximum data transfer rate of the communication line N, the occupied transfer rate calculating portion 16 calculates that the occupied data transfer rate of the mobile terminal 3b is "11.7 KB/s".

The occupied transfer rate calculating portion 16 registers the calculated occupied data transfer rates into the transmission information recording portion 13 (Op24). FIG. 19 is a table showing an example of data of the transmission information recording portion 13 containing the occupied data transfer rates registered in Op24. As shown in FIG. 19, the occupied data transfer rates "18.3 KB/s" and "11.7 KB/s" have been recorded for the terminal IDs "Id001" and "Id002" respectively on the transmission information recording portion 13.

Example of Operation of Occupied Transfer Rate Calculating Portion 16 in Current Time "10:09"

Next, description will be made in the case where the data transmitting portion 17 has deleted the records of the mobile terminal 3a recorded on the destination point recording portion 12 and the transmission information recording portion 13 and has reported an assignment request event to the occupied transfer rate calculating portion 16 in the condition that the mobile terminal 3a has completed download of the contents at the time point 10:09 which is the estimated time "10:09" of arrival of the mobile terminal 3a.

Figure 20:
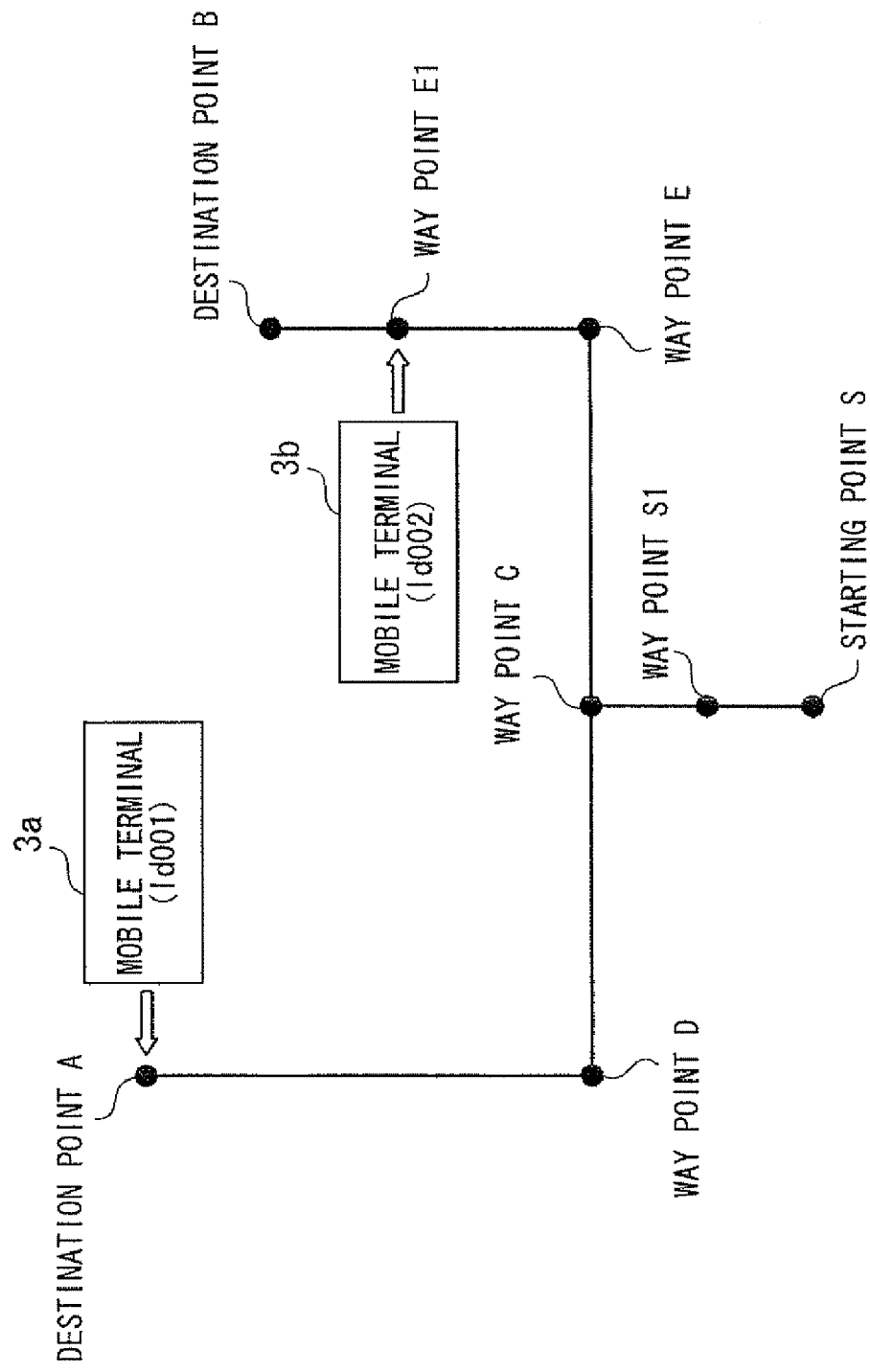
FIG. 20 is a view showing current positions of the mobile terminals at a time point 10:09.

FIG. 20 is a view showing the current position of the mobile terminal 3a and the current position of the mobile terminal 3b at the time point 10:09. As shown in FIG. 20, the user of the mobile terminal 3a has arrived at the destination point A at the time point 10:09. In addition, the user of the mobile terminal 3b is located at a way point E1 at the time point 10:09. Incidentally, the untransmitted size of the mobile terminal 3b recorded on the transmission information recording portion 13 has been updated from "28.5 MB" to "6.56 MB" as shown in FIG. 21. In addition, the required data transfer rate of the mobile terminal 3b recorded on the transmission information recording portion 13 has been updated from "12.5 KB/s" to "15.5 KB/s".

In this case, the occupied transfer rate calculating portion 16 directly assigns a required bandwidth for achievement of the required data transfer rate "15.5 KB/s" of the mobile terminal 3b to the mobile terminal 3b in accordance with an assignment request event reported by the data transmitting portion 17. The occupied transfer rate calculating portion 16 calculates an occupied data transfer rate based on the bandwidth assigned to the mobile terminal 3b. In the embodiment, since the occupied transfer rate calculating portion 16 directly assigns a required bandwidth for achievement of the required data transfer rate "15.5 KB/s" to the mobile terminal 3b, the occupied transfer rate calculating portion 16 calculates that an occupied data transfer rate of the mobile terminal 3b is "15.5 KB/s".

Although the aforementioned description has been made in the case where the occupied transfer rate calculating portion 16 directly assigns the required bandwidth for achievement of the required data transfer rate "15.5 KB/s" of the mobile terminal 3b to the mobile terminal 3b, the invention is not limited thereto. That is, the occupied transfer rate calculating portion 16 may assign the total bandwidth required for achievement of the maximum data transfer rate "30 KB/s" of the communication line N, to the mobile terminal 3b. Since the occupied transfer rate calculating portion 16 assigns the total bandwidth required for achievement of the maximum data transfer rate "30 KB/s" of the communication line N, to the mobile terminal 3b, the occupied transfer rate calculating portion 16 calculates that the occupied data transfer rate of the mobile terminal 3b is "30 KB/s".

In this manner, the mobile terminal 3b can complete download of untransmitted data before the user of the mobile terminal 3b arrives at the destination point B. Since download of the untransmitted data is completed before the user of the mobile terminal 3b arrives at the destination point B, the user of the mobile terminal 3b can view the contents even when the user of the mobile terminal 3b wants to view the contents before arrival at the destination point B. When, for example, another mobile terminal starts to download after the total bandwidth of the communication line N has been assigned to the mobile terminal 3b, the total bandwidth of the communication line N is assigned to the mobile terminal 3b before the other mobile terminal starts to download. Accordingly, the mobile terminal 3b can surely complete download of the untransmitted data before arrival at the destination point B.

Although the aforementioned description has been made in the case where the data transmitting portion 17 reports an assignment request event to the occupied transfer rate calculating portion 16, the invention is not limited thereto. That is, the data transmitting portion 17 may report an assignment request event to the occupied transfer rate calculating portion 16 and report a calculation request event to the arithmetic operation portion 14. In this manner, the arithmetic operation portion 14 can newly calculate the estimated time of arrival and the required data transfer rate of the mobile terminal 3b in accordance with the calculation request event reported by the data transmitting portion 17. Thus, the occupied transfer rate calculating portion 16 can directly assign a required bandwidth for achievement of the newly calculated required data transfer rate of the mobile terminal 3b, to the mobile terminal 3b.

The occupied transfer rate calculating portion 16 registers the calculated occupied data transfer rate into the transmission information recording portion 13. FIG. 21 is a table showing an example of data of the transmission information recording portion 13 containing the calculated occupied data transfer rate registered. As shown in FIG. 21, the occupied data transfer rate "15.5 KB/s" has been recorded for the terminal ID "Id002" on the transmission information recording portion 13. In this manner, the mobile terminal 3b can complete download of untransmitted data at the time when the user of the mobile terminal 3b arrived at the destination point B. As a result, even when another mobile terminal starts to download, the remaining bandwidth in the total bandwidth of the communication line N can be assigned to the other mobile terminal.

According to the data transfer apparatus 1 according to the embodiment as described above, the arrival time calculating portion 14a acquires current position information expressing the current position of each mobile terminal 3 and current time information expressing the current time at intervals of a predetermined time to thereby calculate a latest moving velocity of the mobile terminal 3. For this reason, the arrival time calculating portion 14a can calculate an estimated time of arrival which is an estimated time that a user of the mobile terminal 3 will arrive at a destination point.

The required transfer rate calculating portion 14b calculates a required data transfer rate which is necessary for the mobile terminal 3 to complete download of untransmitted data before the user of the mobile terminal 3 arrives at the destination point. The occupied transfer rate calculating portion 16 assigns required bandwidths for achievement of the required data transfer rates to the respective mobile terminals 3 in order of estimated time of arrival to prevent the sum of the required bandwidths from exceeding the total bandwidth of the communication line N, so that the occupied transfer rate calculating portion 16 calculates occupied data transfer rates to be really used for the respective mobile terminals 3 based on the assigned required bandwidths.

The data transmitting portion 17 transmits the untransmitted data to the respective mobile terminals 3 through the communication line N in accordance with the respective calculated occupied data transfer rates. That is, the data transfer apparatus 1 according to the embodiment calculates the occupied data transfer rates for the respective mobile terminals 3 at intervals of a predetermined time, and transmits the untransmitted data to the respective mobile terminals 3 through the communication line N in accordance with the respective calculated occupied data transfer rates. In this manner, when the moving velocity of a mobile terminal 3 increases during download, or when another mobile terminal 3 starts to download during the download, the mobile terminal 3 can complete download of contents before the user of the mobile terminal 3 arrives at the destination point.

Second Embodiment

Figure 22:
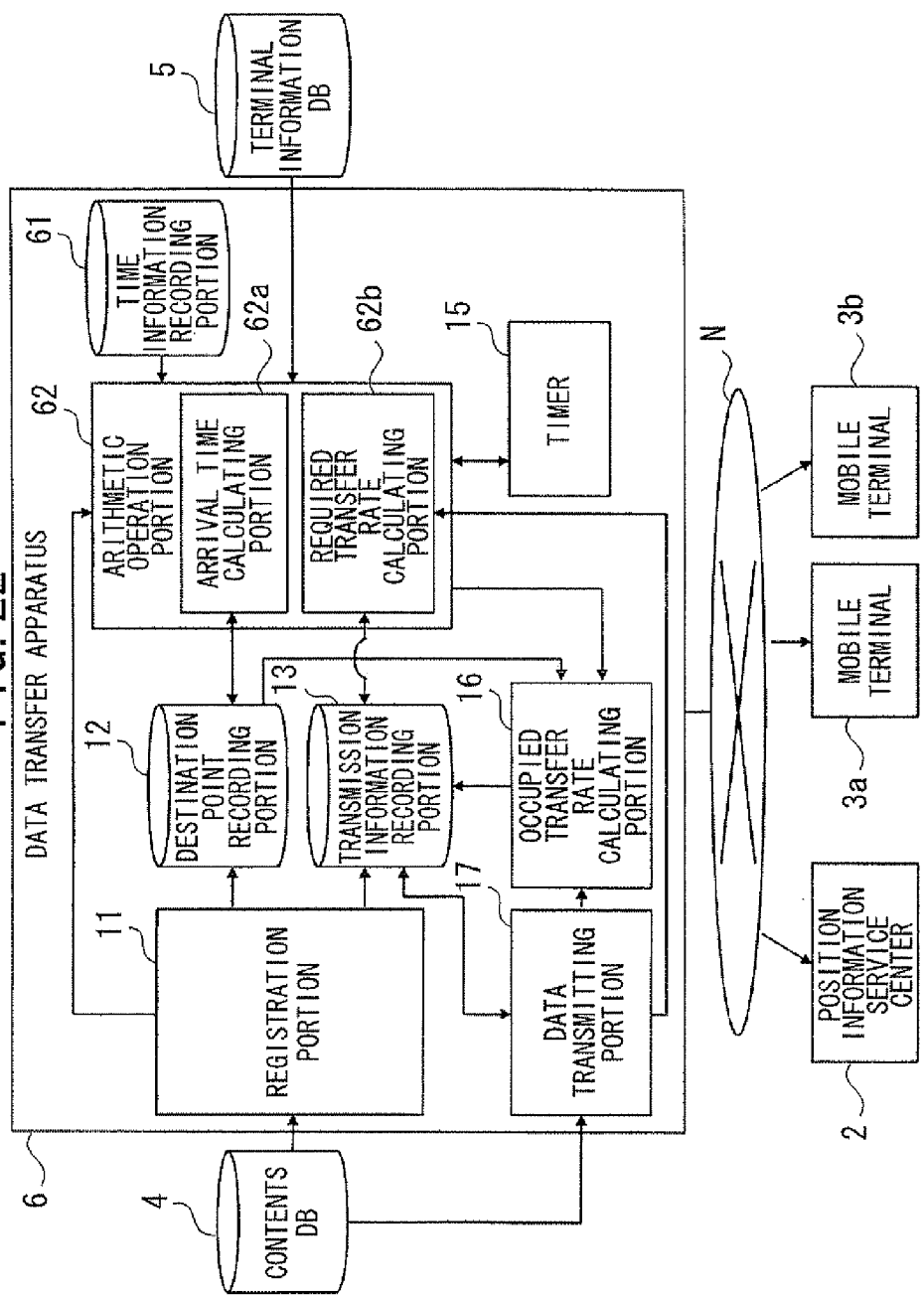
FIG. 22 is a block diagram showing the configuration of a data transfer apparatus according to a second embodiment of the invention, together with the configuration of a whole system including the data transfer apparatus.

FIG. 22 is a block diagram showing the configuration of a data transfer apparatus 6 according to the embodiment, together with the configuration of a whole system including the data transfer apparatus 6. That is, the data transfer apparatus 6 according to the embodiment includes a time information recording portion 61 in addition to the data transfer apparatus 1 shown in FIG. 1. The data transfer apparatus 6 according to the embodiment further includes an arithmetic operation portion 62 in place of the arithmetic operation portion 14 shown in FIG. 1. Incidentally, in FIG. 22, constituent parts having the same functions as those in FIG. 1 are referred to by the same reference numerals and detailed description thereof will be omitted.

The embodiment will be described on the case where the user of the mobile terminal 3a is located at the way point C1 at the time point 9:37 during travel to the destination point A by way of example, as shown in FIG. 16. Incidentally, FIG. 16 is a view showing the current position of the mobile terminal 3a and the current position of the mobile terminal 3b at the time point 9:37 as described in the first embodiment.

The time information recording portion 61 records a distance from the current position of a mobile terminal 3 to a destination point and a timer value. FIG. 23 is a table showing an example of data recorded on the time information recording portion 61 according to the embodiment. As shown in FIG. 23, a timer value which decreases as the distance from the current position of the mobile terminal 3 to the destination point decreases is recorded on the time information recording portion 61.

The arithmetic operation portion 62 includes an arrival time calculating portion 62a and a required transfer rate calculating portion 62b in the same manner as the arithmetic operation portion 14 shown in FIG. 1. After the arithmetic operation portion 62 has registered an estimated time of arrival into the destination point recording point 12 and has registered a required data transfer rate into the transmission information recording portion 13, the arithmetic operation portion 62 sets a time point (timer value) in the timer 15 in accordance with the distance from the current position of the mobile terminal 3 to the destination point so that the arithmetic operation portion 62 will calculate an estimated time of arrival and a required data transfer rate next time at the time point set in the timer 15.

Specifically, the arithmetic operation portion 62 first extracts a timer value from the time information recording portion 61 based on the distance from the current position of the mobile terminal 3 to the destination point. In the embodiment, since the distance from the current position (way point C1) of the mobile terminal 3a to the destination point A is "17.7 km", the arithmetic operation portion 62 extracts a timer value "7 min" from the time information recording portion 61.

The arithmetic operation portion 62 sets the timer value of the mobile terminal 3a to "7 min" in the timer 15. In this manner, the timer 15 can report a calculation request event to the arithmetic operation portion 62 at "9:44" which is 7 minutes later than the current time "9:37". Thus, the arrival time calculating portion 62a can shorten the time interval for acquisition of the current position information and the current time information as the current position of the mobile terminal 3a approaches to the destination point A. Incidentally, the other functions of the arithmetic operation portion 62 are the same as the functions of the arithmetic operation portion 14 shown in FIG. 1.

According to the data transfer apparatus 6 according to the embodiment as described above, the arrival time calculating portion 62a can shorten the time interval for acquisition of the current position information and the current time information as the current position of the mobile terminal 3 approaches to the destination point. In this manner, the required transfer rate calculating portion 62b can accurately calculate a required data transfer rate which is necessary for the mobile terminal 3 to complete download of untransmitted data before the user of the mobile terminal 3 arrives at the destination point.

Incidentally, although the first embodiment and the second embodiment have been described on the case where the data transfer apparatus transmits untransmitted data extracted from contents as a transmission target to a mobile terminal through the communication line in accordance with an occupied data transfer rate calculated by the occupied transfer rate calculating portion while no data transfer-disabled section is taken into consideration, the invention is not limited thereto. That is, the data transfer apparatus may transmit the untransmitted data to the mobile terminal while a data transfer-disabled section is taken into consideration.

Incidentally, the data transfer-disabled section may be a section in which data are not allowed to be transmitted to the mobile terminal from the data transfer apparatus. For example, the data transfer-disabled section is a tunnel section in the case where the mobile terminal is located in a tunnel. Specifically, the user of the mobile terminal registers a data transfer-disabled section in the data transfer apparatus in advance. When the data transfer-disabled section is on a route on which the user of the mobile terminal moves, the arrival time calculating portion calculates an estimated time of arrival based on a distance obtained by subtracting the data transfer-disabled section from the distance between the current position of the mobile terminal and the destination point. In this manner, the data transfer apparatus can transmit the untransmitted data to the mobile terminal while the data transfer-disabled section is taken into consideration.

That is, the invention is not limited to the first and second embodiments but various changes may be made within the scope of claims. That is, embodiments achieved by combining technical means properly changed within the scope of claims are also included in the technical range of the invention.

As described above, the invention is useful as a data transfer apparatus, a data transfer method or a data transfer program by which a mobile terminal can complete download of contents before a user of the mobile terminal arrives at a destination point even when the moving velocity of the mobile terminal increases during the download or even when another mobile terminal starts to download during the download.

As described above, the data transfer apparatus, the data transfer method and the data transfer program according to the invention exerts an effect that a mobile terminal can complete download of contents before a user of the mobile terminal arrives at a destination point even when the moving velocity of the mobile terminal increases during the download or even when another mobile terminal starts to download during the download.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A data transfer apparatus comprising: a data transmitting device which extracts pieces of untransmitted data from a plurality of contents as transmission targets respectively and transmits the extracted pieces of untransmitted data to a plurality of mobile terminals respectively through a communication line;
a destination point recording device on which destination point information expressing destination points as travel destinations of users of the mobile terminals is recorded;
an arrival time calculating device which acquires current position information expressing current positions of the mobile terminals and current time information expressing a current time at intervals of a predetermined time in order to calculate latest moving velocities of the mobile terminals based on the current position information and the current time information acquired at a previous time and the current position information and the current time information acquired at this time, and then to calculate estimated times of arrival as estimated times that the users of the mobile terminals will arrive at the destination points, based on the calculated moving velocities of the mobile terminals and distances from the current positions of the mobile terminals to the destination points;
a required transfer rate calculating device which calculates required data transfer rates necessary for the mobile terminals to complete download of the pieces of untransmitted data before the users of the mobile terminals arrive at the destination points, based on times obtained by subtracting the current time from the estimated times of arrival calculated by the arrival time calculating device and data capacities of the pieces of untransmitted data; and
an occupied transfer rate calculating device which assigns required bandwidths for achievement of the required data transfer rates to the respective mobile terminals in order of estimated time of arrival to prevent the sum of the required bandwidths from exceeding a total bandwidth of the communication line to thereby calculate occupied data transfer rates to be really used for the respective mobile terminals based on the assigned required bandwidths; wherein:

the data transmitting device transmits the pieces of untransmitted data to the respective mobile terminals through the communication line in accordance with the respective occupied data transfer rates calculated by the occupied transfer rate calculating device.

2. A data transfer apparatus according to claim 1, wherein when one of the plurality of mobile terminals has not completed download of the untransmitted data, the occupied transfer rate calculating device assigns a required bandwidth for achievement of the required data transfer rate of the mobile terminal to the mobile terminal to thereby calculate an occupied data transfer rate to be really used for the mobile terminal based on the assigned required bandwidth.

3. A data transfer apparatus according to claim 1, wherein when one of the plurality of mobile terminals has not completed download of the untransmitted data, the occupied transfer rate calculating device assigns the total bandwidth of the communication line to the mobile terminal to thereby calculate an occupied data transfer rate to be really used for the mobile terminal based on the assigned total bandwidth.

4. A data transfer apparatus according to claim 1, wherein the arrival time calculating device shortens the time interval for acquisition of the current position information and the current time information as each of the distances between the current positions of the mobile terminals and the destination points becomes shorter.

5. A data transfer method executed by a computer which includes a destination point recording portion with recorded destination point information expressing destination points as travel destinations of users of mobile terminals and which extracts pieces of untransmitted data respectively from a plurality of contents as transmission targets and transmits the extracted pieces of untransmitted data respectively to the plurality of mobile terminals through a communication line, the data transfer method comprising the operations of:

using an arrival time calculating portion provided in the computer to acquire current position information expressing current positions of the mobile terminals and current time information expressing a current time at intervals of a predetermined time to thereby calculate latest moving velocities of the mobile terminals based on the current position information and the current time information acquired at a previous time and the current position information and the current time information acquired at this time, and then to calculate estimated times of arrival as estimated times that the users of the mobile terminals will arrive at the destination points, based on the calculated moving velocities of the mobile terminals and distances from the current positions of the mobile terminals to the destination points (the arrival time calculating operation);

using a required transfer rate calculating portion provided in the computer to calculate required data transfer rates necessary for the mobile terminals to complete download of the pieces of untransmitted data before the users of the mobile terminals arrive at the destination points, based on times obtained by subtracting the current time from the estimated times of arrival calculated in the arrival time calculating operation and data capacities of the pieces of untransmitted data (the required transfer rate calculating operation);

using an occupied transfer rate calculating portion provided in the computer to assign required bandwidths for achievement of the required data transfer rates to the respective mobile terminals in order of estimated time of arrival to prevent the sum of the required bandwidths from exceeding a total bandwidth of the communication line to thereby calculate occupied data transfer rates to be really used for the respective mobile terminals, based on the assigned required bandwidths (the occupied transfer rate calculating operation); and using a data transmitting portion provided in the computer to transmit the pieces of untransmitted data to the respective mobile terminals through the communication line in accordance with the respective occupied data transfer rates calculated in the occupied transfer rate calculating operation (the data transmitting operation).

6. A non-transitory computer-readable recording medium with a data transfer program stored therein and executed by a computer which includes a destination point recording portion with recorded destination point information expressing destination points as travel destinations of users of mobile terminals, the data transfer program including:

a data transmitting process of extracting pieces of untransmitted data from a plurality of contents as transmission targets respectively and transmitting the extracted pieces of untransmitted data to the plurality of mobile terminals respectively through a communication line;

an arrival time calculating process of acquiring current position information expressing current positions of the mobile terminals and current time information expressing a current time at intervals of a predetermined time to thereby calculate latest moving velocities of the mobile terminals based on the current position information and the current time information acquired at a previous time and the current position information and the current time information acquired at this time, and then to calculate estimated times of arrival as estimated times that the users of the mobile terminals will arrive at the destination points, based on the calculated moving velocities of the mobile terminals and distances from the current positions of the mobile terminals to the destination points;

a required transfer rate calculating process of calculating required data transfer rates necessary for the mobile terminals to complete download of the pieces of untransmitted data before the users of the mobile terminals arrive at the destination points, based on times obtained by subtracting the current time from the estimated times of arrival calculated in the arrival time calculating process and data capacities of the pieces of untransmitted data; and an occupied transfer rate calculating process of assigning required bandwidths for achievement of the required data transfer rates to the respective mobile terminals in order of estimated time of arrival to prevent the sum of the required bandwidths from exceeding a total bandwidth of the communication line to thereby calculate occupied data transfer rates to be really used for the respective mobile terminals based on the assigned required bandwidths; wherein:

the data transmitting process is for transmitting the pieces of untransmitted data to the respective mobile terminals through the communication line in accordance with the respective occupied data transfer rates calculated in the occupied transfer rate calculating process.

* * * * *